(12) United States Patent
Halberstadt

(10) Patent No.: US 9,065,350 B2
(45) Date of Patent: Jun. 23, 2015

(54) RESONANT CONVERTER CONTROL BASED ON A VOLTAGE DIFFERENCE

(75) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 370 days.

(21) Appl. No.: 13/546,932

(22) Filed: Jul. 11, 2012

(65) Prior Publication Data

US 2013/0016533 A1 Jan. 17, 2013

(30) Foreign Application Priority Data

Jul. 15, 2011 (EP) .................................... 11250660

(51) Int. Cl.
*H02M 3/337* (2006.01)
*H02M 1/00* (2007.01)

(52) U.S. Cl.
CPC .......... *H02M 3/3376* (2013.01); *Y02B 70/1433* (2013.01); *H02M 2001/0058* (2013.01); *Y02B 70/1491* (2013.01)

(58) Field of Classification Search
CPC ............ H02M 3/3378; H02M 3/3376; H02M 3/3359; H02M 2007/4815; H02M 2001/0058; H03K 17/165; H03K 17/166; H03K 17/167; H03K 2217/009
USPC ............. 363/16, 17, 24, 25, 26, 98, 131, 132, 363/133, 134, 20, 21.02, 21.06, 21.1, 89
See application file for complete search history.

(56) References Cited

U.S. PATENT DOCUMENTS

| | | | |
|---|---|---|---|
| 6,178,099 B1 | 1/2001 | Schutten et al. | |
| 6,212,079 B1 | 4/2001 | Balakrishnan et al. | |
| 6,396,716 B1 | 5/2002 | Liu et al. | |
| 6,418,038 B2 * | 7/2002 | Takahama et al. | 363/17 |
| 6,711,034 B2 * | 3/2004 | Duerbaum et al. | 363/16 |

(Continued)

FOREIGN PATENT DOCUMENTS

| | | |
|---|---|---|
| DE | 199 40 137 A1 | 3/2001 |
| EP | 0 902 528 A2 | 3/1999 |

(Continued)

OTHER PUBLICATIONS

Oruganti, R. et al. "Resonant Power Processors, Part I—State Plan Analysis", IEEE Transactions on Industry Applications, vol. IA-21, No. 6, pp. 1453-1460 (Nov. 1985).

(Continued)

*Primary Examiner* — Adolf Berhane
*Assistant Examiner* — Jye-June Lee

(57) ABSTRACT

Consistent with an example embodiment there is a method of controlling a resonant power converter; the power converter includes first and second series connected switches connected between a supply voltage line and a ground line and a resonance circuit, having a capacitor and an inductor. The resonance circuit is connected to a node connecting the first and second switches. The method comprises repeated sequential steps of closing the first switch to start a conduction interval; sampling a voltage across the capacitor to obtain a sampled voltage level; and opening the first switch to end the conduction interval when a voltage across the capacitor crosses a voltage level determined by addition of the sampled voltage level with a predetermined voltage difference; wherein controlling the predetermined voltage difference determines a power output of the resonant power converter.

9 Claims, 23 Drawing Sheets

(56) References Cited

U.S. PATENT DOCUMENTS

| | | | |
|---|---|---|---|
| 7,184,280 B2* | 2/2007 | Sun et al. | 363/21.02 |
| 7,701,736 B2* | 4/2010 | Yang et al. | 363/89 |
| 7,733,669 B2* | 6/2010 | Jiao et al. | 363/16 |
| 7,885,084 B2* | 2/2011 | Yang et al. | 363/21.01 |
| 7,944,716 B2* | 5/2011 | Halberstadt | 363/25 |
| 8,339,817 B2* | 12/2012 | Halberstadt | 363/24 |
| 2003/0043599 A1 | 3/2003 | Duerbaum et al. | |
| 2007/0285068 A1 | 12/2007 | Balakrishnan et al. | |
| 2008/0266908 A1* | 10/2008 | Halberstadt | 363/21.02 |
| 2009/0091951 A1* | 4/2009 | Yang et al. | 363/21.06 |
| 2009/0303753 A1* | 12/2009 | Fu et al. | 363/20 |
| 2010/0020570 A1* | 1/2010 | Melanson et al. | 363/26 |
| 2010/0033998 A1 | 2/2010 | Halberstadt | |
| 2010/0208499 A1* | 8/2010 | Halberstadt | 363/21.1 |
| 2011/0187335 A1 | 8/2011 | Grakist et al. | |

FOREIGN PATENT DOCUMENTS

| | | |
|---|---|---|
| EP | 1 530 282 A1 | 5/2005 |
| WO | 2005/112238 A2 | 11/2005 |
| WO | 2006103606 A1 | 10/2006 |
| WO | 2006103609 A2 | 10/2006 |
| WO | 2008/104919 A1 | 9/2008 |
| WO | 2009004582 A1 | 1/2009 |
| WO | 2009037613 A1 | 3/2009 |
| WO | 2009/098640 A1 | 8/2009 |

OTHER PUBLICATIONS

Oruganti, R. et al. "Resonant Power Processors, Part II—Methods of Control", IEEE Transactions on Industry Applications, vol. IA-21, No. 6, pp. 1461-1471 (Nov. 1985).

Svakumar, S. et al. "Optimal Trajectory Control of Series Resonant Converter Using Modified Capacitor Voltage Control Technique", IEEE $22_{nd}$ Annual Power Electronics Specialist Conference, pp. 752-759 (Jun. 1991).

Orguanti, R. et al. "Resonant-Tank Control of Parallel Resonant Converter", IEEE Transactions on Power Electronics, vol. 8, No. 2, pp. 127-134 (Apr. 1993).

Extended European Search Report for Patent Appln. No. 11250660.5 (Jan. 2, 2012).

* cited by examiner

RESONANT CONVERTER CONTROL BASED ON A VOLTAGE DIFFERENCE

This application claims the priority under 35 U.S.C. §119 of European patent application no. 11250660.5, filed on Jul. 15, 2011, the contents of which are incorporated by reference herein.

The invention relates to methods of controlling operation of a resonant power converter and to controllers configured to operate according to such methods.

BACKGROUND OF THE INVENTION

For electrical power converters operating at power levels larger than around 100 W at full load, a resonant topology is useful due to its high efficiency, small volume and high power density. At these power levels, the extra cost of resonant converters compared with other converters is compensated for by the additional advantages of a resonant topology. There are several types of resonant converters, using either half bridge or full bridge configurations, and the number of resonant components may vary.

A general circuit diagram of a series resonant converter 100 is illustrated in FIG. 1. The converter comprises a primary side circuit 101 and a secondary side circuit 102, with a transformer 103 common to the two circuits. The resonant components of the converter 100 comprise a capacitor Cr and inductor Ls on the primary side circuit 101, arranged in series and connected to a node 104 between a pair of switches 105a, 105b connected across a voltage supply 106. Operation of the pair of switches 105a, 105b is controlled by a switching controller 107 (not shown), which causes the switches 105a, 105b to open and close in a defined sequence and at a defined frequency. The timing of the switches can be varied to vary the output voltage Vout at the secondary side circuit 102. The output voltage may be regulated to a constant value, while delivering power to a desired load (known as Constant Voltage, or CV, mode), or the output may be regulated to deliver a desired current level when the load forces a certain output voltage (known as Constant Current, or CC, mode). As the magnetizing inductance of the transformer is relatively large (and ideally for a pure series resonant converter it is infinite) compared with the series inductor Ls, it effectively does not form part of the resonant circuit.

A low or zero voltage across each switch is desirable at the moment the switch is operated (i.e. closed, or made conductive), as this reduces switching losses and avoids damage to the semiconductor switches. This is generally known as soft switching. Because of the large value of the magnetizing inductance of the series resonant converter 100, the stored energy in the magnetizing inductance is not sufficient to provide for soft switching. The current in the series inductance Ls is therefore necessary to obtain soft switching.

Other types of converters derived from the basic series type resonant converter shown in FIG. 1 are also known, including multi resonant converters, in which more than two components take part in resonance. One such variant is the LLC converter 200, an example of which is illustrated in FIG. 2. Besides the series resonant components Ls and Cr, a magnetizing inductance Lm also takes part in the resonance. This configuration allows for operation at a frequency below series resonance in a so-called discontinuous mode, as the magnetizing inductance Lm allows for soft switching when the secondary side circuit diodes are not conducting.

Another variant is the LCC converter 300, an example of which is illustrated in FIG. 3, in which a second resonant capacitor Cp is provided in the secondary side circuit. An important difference compared with the LLC converter 200 is the difference in behaviour of the LCC converter 300 due to this parallel capacitor Cp, which results in a low output voltage at high switching frequencies. An LLC converter 200 gives a fixed output voltage at high switching frequencies.

LLC type converters are often operated with a 50% duty cycle at the half bridge node (i.e. the node between the pair of switches), with a variation of the switching frequency used to regulate the output power. This method gives an acceptable efficiency for medium to large loads. For low loads, however, there is a drawback of a relatively large circulating current. This results in a decreased efficiency at low load.

SUMMARY OF THE INVENTION

In accordance with a first aspect of the invention there is provided a method of controlling a resonant power converter having first and second series connected switches connected between a supply voltage line and a ground line and a resonance circuit comprising a capacitor and an inductor, the resonance circuit connected to a node connecting the first and second switches, the method comprising the repeated sequential steps of:

closing the first switch to start a conduction interval;

sampling a voltage across the capacitor to obtain a sampled voltage level; and opening the first switch to end the conduction interval when a voltage across the capacitor crosses a voltage level determined by addition of the sampled voltage level with a predetermined voltage difference, wherein controlling the predetermined voltage difference determines a power output of the resonant power converter.

By controlling the predetermined voltage difference, an amount of energy input to the resonance circuit (or resonant tank) is controlled. Together with the resulting switching frequency, this determines the power output of the resonant power converter. An advantage of the invention therefore is that the power output can be controlled by altering this voltage difference, which can overcome existing problems relating to frequency control.

A further advantage of the invention is that, because a voltage difference is used rather than an absolute voltage for determining the conduction intervals, DC offset levels are not required. This makes the use of resistive dividers unnecessary, thereby simplifying the circuit.

The resonant power converter may have a half bridge or full bridge topology. In the case of a half bridge resonant power converter, the resonance circuit is connected between the node connecting the first and second switches and the ground line. In the alternative case of a full bridge resonant power converter, the resonance circuit is connected between the node connecting the first and second switches and a further node connecting third and fourth switches comprising a second half bridge of the full bridge instead of ground.

Where the conduction interval is a first conduction interval, the sampled voltage level is a first sampled voltage level and the predetermined voltage difference is a first predetermined voltage difference, the method may further comprise the repeated sequential steps of:

closing the second switch to start a second conduction interval;

sampling a voltage across the capacitor to obtain a second sampled voltage level; and opening the second switch to end the second conduction interval when a voltage across the capacitor crosses a voltage level determined by addition of the second sampled voltage level to a second predetermined voltage difference.

The first and second conduction intervals may alternate over time. In some embodiments, for example in a low power mode of operation, the first conduction interval may not be directly followed by the second conduction interval but instead by a period where both switches are opened before repeating a switching sequence.

During the first conduction cycle the node connecting the switches is preferably connected to the supply voltage line and during the second conduction cycle the node is preferably connected to the ground line.

The first and second predetermined voltage differences may be equal in magnitude, resulting in steady state operation of the resonant power converter. The first and second predetermined voltage differences may alternatively be unequal in magnitude, resulting in a changing power output of the resonant power converter, for example during a transition towards a new steady state power output.

A difference between the magnitude of the first and second predetermined voltage differences may be dependent on a difference between a sensed voltage across the capacitor and the supply voltage.

A difference between the magnitude of the first and second predetermined voltage differences may be dependent on a duty cycle of a voltage signal at the node connecting the first and second switches.

A difference between the magnitude of the first and second predetermined voltage differences may be dependent on a ratio between a measure of output current over the first conduction interval and the second conduction interval.

The measure of output current can be a peak value or an average value.

According to a second aspect of the invention there is provided a resonant power converter comprising primary and secondary side circuits, the primary side circuit having first and second series connected switches connected between a supply voltage line and a ground line and a resonance circuit comprising a capacitor and an inductor, the resonance circuit connected to a node connecting the first and second switches, wherein the resonant power converter is configured to perform the repeated sequential steps of:

closing the first switch to start a conduction interval;

sampling a voltage across the capacitor to obtain a sampled voltage level; and opening the first switch to end the conduction interval when a detector detects a voltage across the capacitor crossing a voltage level determined by addition of the sampled voltage level with a predetermined voltage difference, such that control of the predetermined voltage difference determines a power output of the resonant power converter.

Where the conduction interval is a first conduction interval, the sampled voltage level is a first sampled voltage level, the predetermined voltage difference is a first predetermined voltage difference and the detector is a first detector, the resonant power converter may be configured to perform the repeated sequential steps of:

closing the second switch to start a second conduction interval;

sampling a voltage across the capacitor to obtain a second sampled voltage level; and opening the second switch to end the second conduction interval when a second detector detects a voltage across the capacitor crossing a voltage level determined by addition of the second sampled voltage level to a second predetermined voltage difference, wherein the first and second conduction intervals alternate over time.

The detector may comprise a sampling module configured to sample the voltage across the capacitor as the first switch is closed, a summing module configured to provide a signal of the voltage across the capacitor offset by the predetermined voltage difference and a comparator configured to compare the signal from the summing module with the sampled signal and output a signal dependent on the comparison.

The resonant power converter may be further configured to perform one or more of the preferred or optional features according to the first aspect of the invention.

BRIEF DESCRIPTION OF THE DRAWINGS

Embodiments according to aspects of the invention are described by way of example below, with reference to the accompanying drawings in which:

FIG. 6b is a schematic diagram of a variation in sensed voltage and a switching cycle for a high side switch of the converter of FIG. 6a;

DETAILED DESCRIPTION OF EMBODIMENTS

Figure 1:
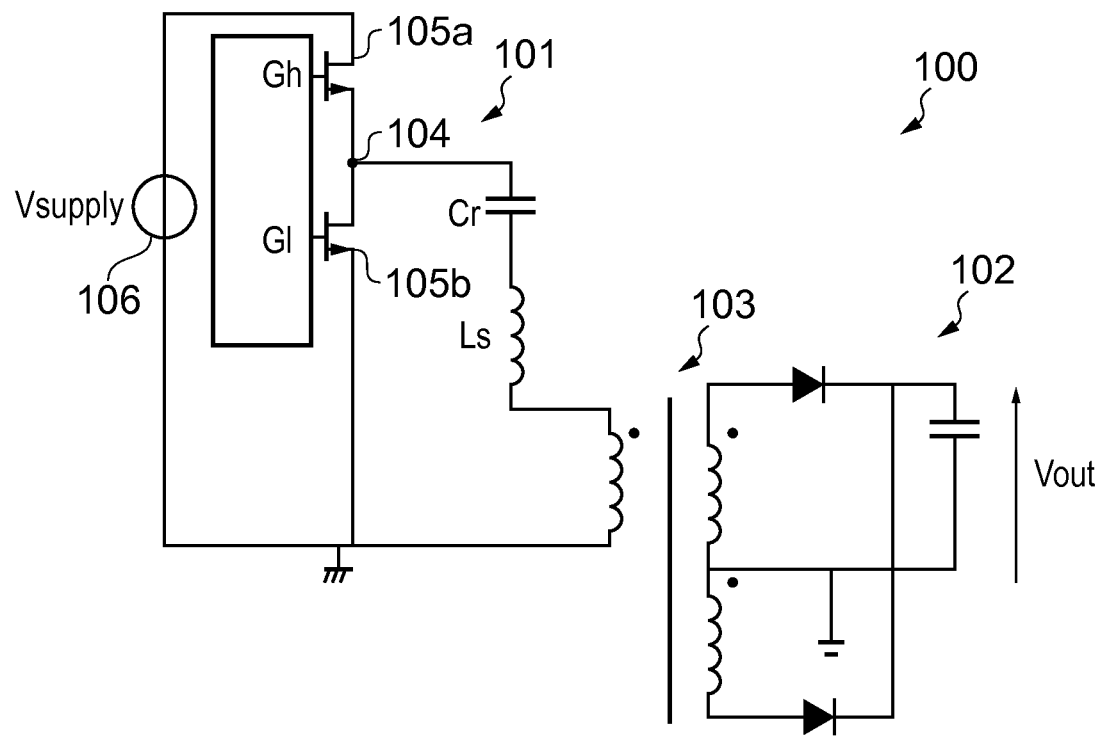
FIG. 1 is a schematic circuit diagram of a series resonant converter.

For control of the mode of operation of a resonant converter, an optimum timing of how the switches are operated needs to be determined. This can be an iterative process that requires a practical solution. One possible method can be illustrated using a so-called state plane representation, in which the voltage across a resonant capacitor is plotted against the current in the resonant tank. Using state plane representations, methods can be derived for controlling the resonant converter. One such method is capacitor voltage control, which involves controlling the way in which the switches are operated dependent on a sensed voltage across a capacitor forming part of the resonance circuit. According to this method, a voltage across the resonant capacitor is used to determine the timing for the switches that control the voltage across the resonant tank. Another method, optimum trajectory control, may be used in which the state plane trajectory, i.e. the relation between the capacitor voltage and current, is used to create a vector as a control input for controlling the switches. This method requires constant monitoring of a series of variables, which in a practical application will each need to be sensed, and requires complicated logic to derive control signals for the switches from these variables. These requirements may prevent such a method from being widely applied, particularly in high volume consumer applications where cost and complexity need to be minimised as far as possible.

Capacitor voltage control is generally a preferred solution, but has a practical disadvantage. Two levels are defined, Vcrh and Vcrl, for switching off a conducting switch when Vcr (the voltage across the capacitor Cr, i.e. a series capacitor forming part of the resonance circuit) crosses the level Vcrh (a high level) or Vcrl (a low level). The DC component of the voltage across the resonant capacitor is directly related to the duty cycle and the input voltage of the converter that generates the square wave voltage across the resonant tank by operating the switches. For a 50% duty cycle operation, the DC value of Vcr equals half of the supply voltage, while at low power levels the difference between Vcrh and Vcrl tends towards zero. The result of this is that any offset in sensing the DC component has a large effect on the duty cycle and may result in improper functioning of the converter.

For processing a capacitor voltage signal by a controller IC (integrated circuit), it is necessary to accurately incorporate information relating to the DC component. The amplitude of the voltage across the resonant capacitor is in general too large to be processed. A capacitive divider can be used to reduce this amplitude without loss of high frequency components, although at the expense of losing any low frequency or DC information. An alternative is to use a relatively low ohmic resistive divider, but this results in extra losses and an efficiency reduction. This leads to the need for a high ohmic resistive divider. In order to obtain a desired operation it is further necessary to provide for a proper division factor, which is different for DC (by the resistive divider) compared to AC (by the capacitive divider). Using resistive dividers both the input voltage of the converter and the capacitor voltage should be divided by the same factor. When this factor is not properly matched for both dividers, a problem occurs at low power levels, as the error on the DC component becomes of the same order of magnitude as the signal level, giving unacceptable asymmetry or even malfunction.

A variant on capacitor voltage control may be used where, instead of a voltage across the resonant capacitor, a voltage across the transformer minus the voltage across the resonant capacitor is used as input information to control operation of the switches. Since the DC component of the voltage across the transformer is always zero, while the DC component across the capacitor is not, this avoids the need for transferring DC information. At zero power, the difference between these levels is equal to the input voltage of the converter, while for capacitor voltage control this difference is zero, resulting in a need for sensing the input voltage of the converter.

Figure 2:
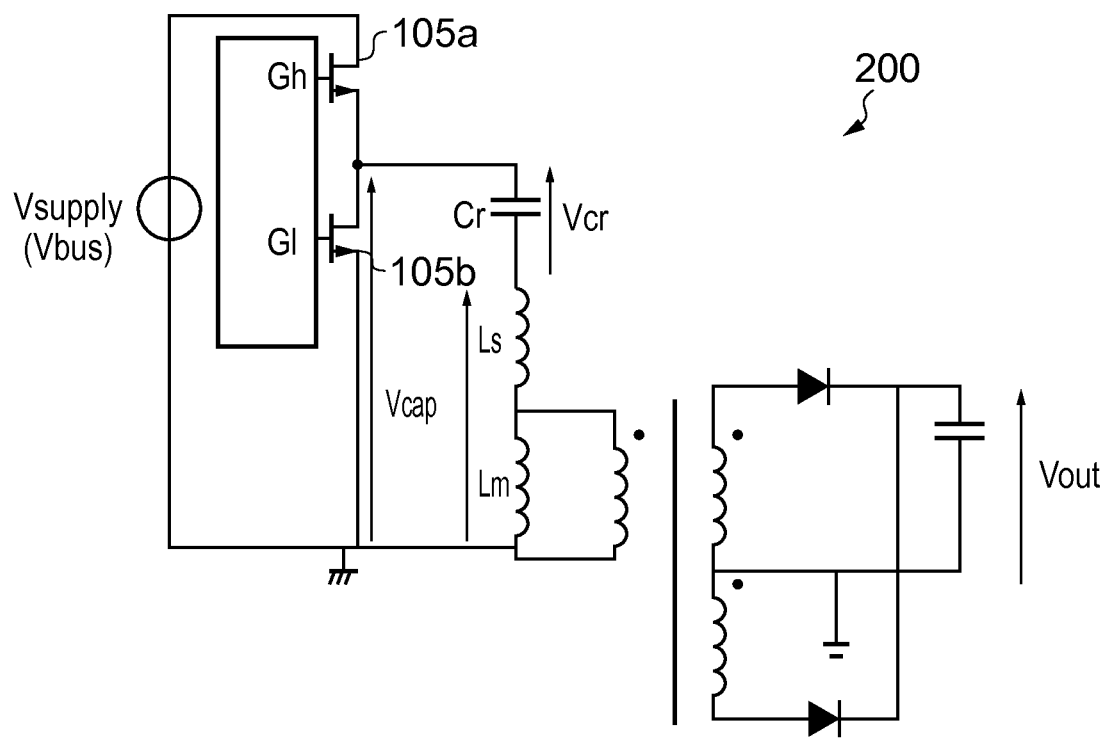
FIG. 2 is a schematic circuit diagram of a multi resonant LLC converter.
Figure 3:
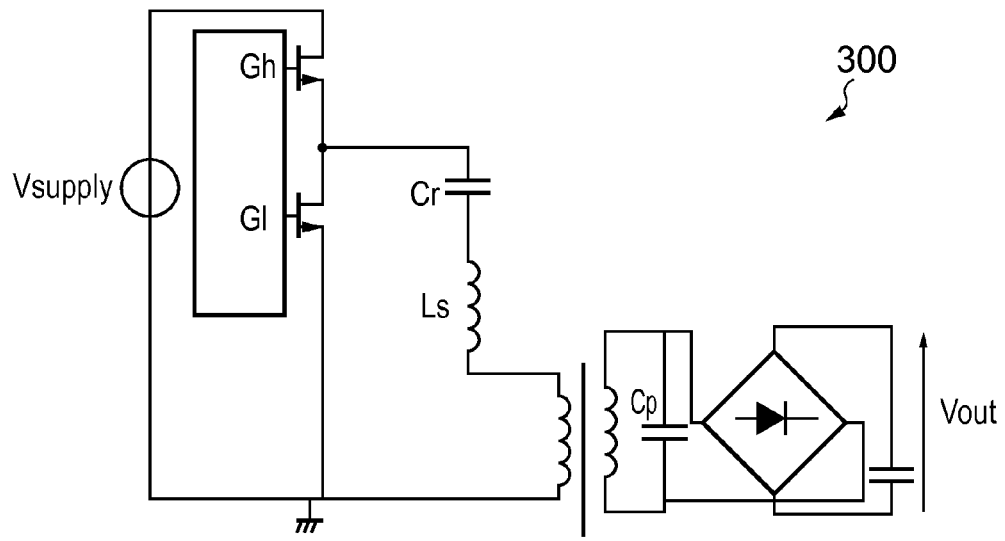
FIG. 3 is a schematic circuit diagram of a multi resonant LCC converter.
Figure 4:
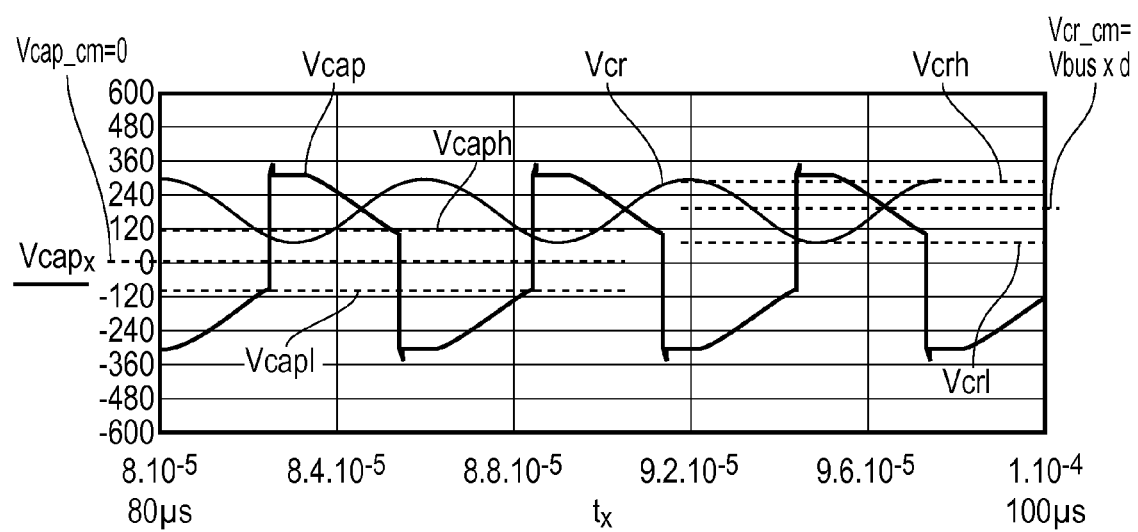
FIG. 4 is a plot of voltage as a function of time for a resonant capacitor and series connected inductance of a resonant converter.

To demonstrate this difference, typical wave forms for an LLC converter according to the circuit of FIG. 2, showing the signal Vcr (the voltage across capacitance Cr) and Vcap (the voltage across the series inductors Ls+Lm), are shown in FIG. 4. The points where these voltage signals are derived are indicated in the circuit diagram of FIG. 2, including the voltage signal Vhb, which is the voltage at the half bridge node between the pair of switches 105a, 105b driven by switching signals Gh, Gl. Also shown in FIG. 4 are the levels of Vcapl and Vcaph and those for Vcrl and Vcrh.

The following relations apply between Vhb, Vcap and Vcr and the common mode (or DC offset) value of Vcap, Vcr_cm:

$Vcr = Vhb - Vcap$ $Vcr\_cm = Vbus \times d$ $Vcrh = Vcr\_cm + deltaV/2$ $Vcrl = Vcr\_cm - deltaV/2$ $Vcr = Vhb - Vcap$ gives $Vcap = Vhb - Vcr$ giving $Vcaph = Vbus - Vcrh$ $Vcapl = -Vcrl$ $Vcapcm = 0$ $Vcaph = Vbus - [Vbus \times d + deltaV/2] = Vbus \times d - deltaV/2$ $Vcapl = -Vbus \times d + deltaV/2$ where deltaV is the difference between Vcrh and Vcrl and d is the duty cycle (which is between 0 and 1). The above relationships show that the duty cycle d can be set by Vcr_cm (equal to Vbus×d), while the power can be set by a differential mode signal (+/−deltaV).

Figure 5:
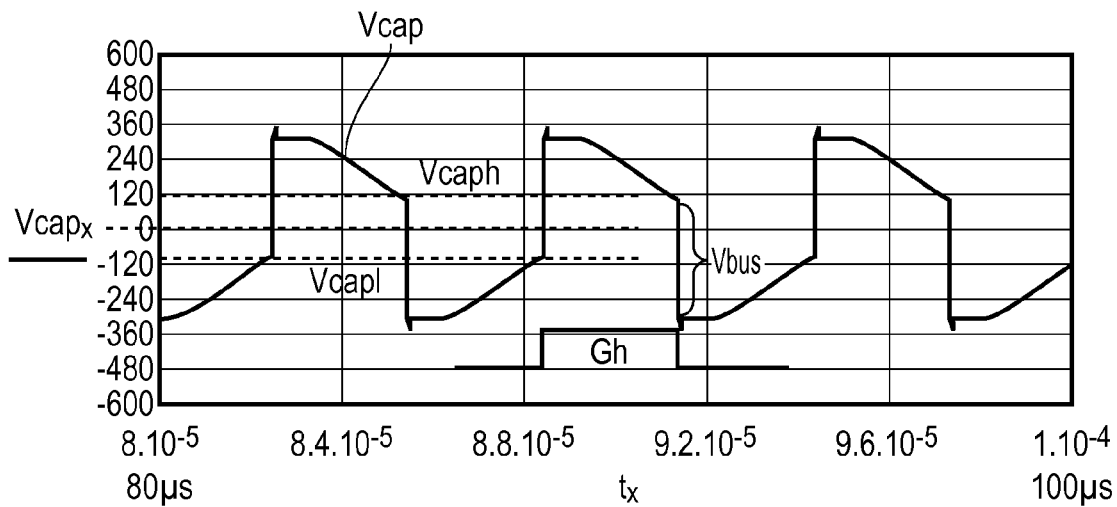
FIG. 5 is a plot of voltage as a function of time for a resonant capacitor.

FIG. 5 shows how the voltage Vcap can be used to determine the term Vbus as needed to set the zero power level. During the high side conduction cycle, the signal that drives the high side switch (Gh) can be used to take a sample of Vcap (at the capacitive divider) just at the rising slope and just after the falling slope of Gh and take the difference between both samples as a value for Vbus, as indicated in FIG. 5.

The signal Vcap can be sampled for example at the falling slope of Gh to obtain the first value. Because of the delay between the logic signal and the switch being turned off, the first sample is taken before the slope. The second sample can be taken just after the slope where Vhb is detected. This gives the second sampled Vcap value just after the negative slope. The difference between both values is the desired Vbus including the capacitive division factor Energy input from the voltage supply into the resonant tank is directly related to the voltage difference deltaV between the beginning and end of the high side switching (HSS) conduction cycle. This can be derived as follows.

$$Q=Cr \times \text{delta}V$$

where Q is the charge flowing from Vbus to Cr. This results in an average current I being $$I=Q \times F\text{switch}$$

where Fswitch is the switching frequency.

Multiplying the average current I with the bus voltage Vbus gives the power P taken from the supply:

$$P=I \times V\text{bus}$$

which, given the above relationships can be rewritten as:

$$P=Cr \times \text{delta}V \times F\text{switch} \times V\text{bus}$$

As a result, if the switching frequency Fswitch is constant, the power output is proportional to, and therefore controllable by, deltaV. In practice, Fswitch will tend to change although the changes in frequency may be small.

At low power levels, the advantage of the Vcap control method that allows use of a capacitive divider becomes clear since, as deltaV becomes small, Vcaph reaches +Vbus/2 (at a 50% duty cycle) while Vcapl reaches −Vbus/2. An error in sensing Vbus in order to set this difference (±Vbus/2) gives a shift in the control parameter to reach zero power. A shift in the common mode signal (Vbus/2×d) however gives an error in the duty cycle, but this error is much less critical using a capacitive divider compared to Vcr control, which relies on a match between resistive dividers, where large signals are divided and a small difference results.

Other modes of operation are also possible, such as burst mode or low power modes. A low power mode for a resonant converter may be used where a well defined energy level can be set and where a well defined repetition time for a conversion cycle can be chosen. An improvement of this type of low power mode may involve setting an optimum energy per cycle in relation to efficiency. A further improvement in this low power mode may be used where an optimum converted energy level for maximum efficiency is set, while a circulating magnetizing current is prevented as much as possible by temporarily storing magnetizing energy in the resonant capacitor in combination with an energy dump interval where magnetizing energy is dumped to the load, thereby further improving efficiency. The latter two improved methods are also suited for burst mode operation. As these modes are more complex, the capacitor voltage control method (Vcr) or Vcap control method is well suited to drive these modes of operation.

Using the capacitor voltage (or Vcap) control method (Vcr) requires transferring the DC component of Vcr, which can result in a matching problem. The Vcap control method can partially solve this, although the value of the input voltage of the resonant converter needs to be sensed as it is directly related to the zero power point for the control variable. An offset in the division factor caused by a mismatch between a capacitive divider (for monitoring Vcap) and a resistive divider (for sensing the input voltage) due to component tolerances can result in an unacceptable shift of the operating point for zero power. This results in the need to sense both the input voltage and Vcap by the same capacitive divider. The amplitude of the capacitively divided Vcap voltage therefore needs to be sampled directly before and after a switching event in order to reconstruct the input voltage. A sampling circuit to achieve this can however result in a complex practical implementation. One object of the invention was therefore to find a solution in order to maintain the other advantages of capacitor voltage control over other known methods of frequency control while avoiding or minimising such problems.

According to embodiments of the invention a variant on capacitor voltage control is used to derive a timing signal for driving the switches, while avoiding the need for transferring the DC component to the controller. This can be achieved by sampling the voltage Vcr across a sensing capacitor, i.e. a series connected capacitor forming part of the resonance circuit, at the start of a conduction interval of one of the switches to obtain a sampled value, then opening the switch when the voltage Vcr across the capacitor crosses a level that is determined by the sampled value and a predetermined voltage difference deltaV, which defines the end of the conduction interval. The voltage Vcap (see FIG. 2) may alternatively be used as the sampled voltage, as this is the difference between the half bridge voltage and the voltage Vcr across the capacitor. The DC component of the voltage across the capacitor is set over two half cycles, i.e. a first half cycle in which the primary side circuit is connected to a supply voltage line through a first (or high side) switch, and a second half cycle in which the primary side circuit is connected to a ground line through a second (or low side) switch. A difference in deltaV between both half cycles is made dependent on a variable that determines the DC component of the voltage across the capacitor. The variable may for example be: i) the voltage across the capacitor, Vcr; ii) the average voltage across the capacitor over one or more full cycles; iii) the duty cycle of the voltage at the half bridge node between the switches; iv) a ratio between the average output current over one half cycle and a subsequent half cycle; v) a difference between the average output current over one half cycle and a subsequent half cycle; vi) a ratio between the peak value of the output current during one half cycle and a subsequent half cycle; vii) a difference between the peak value of the output current over one half cycle and a subsequent half cycle; and viii) an output of a multiple output converter, where each output controls a combination of a common mode term (Vcm) and a differential mode term (Vdm).

Figure 6A:
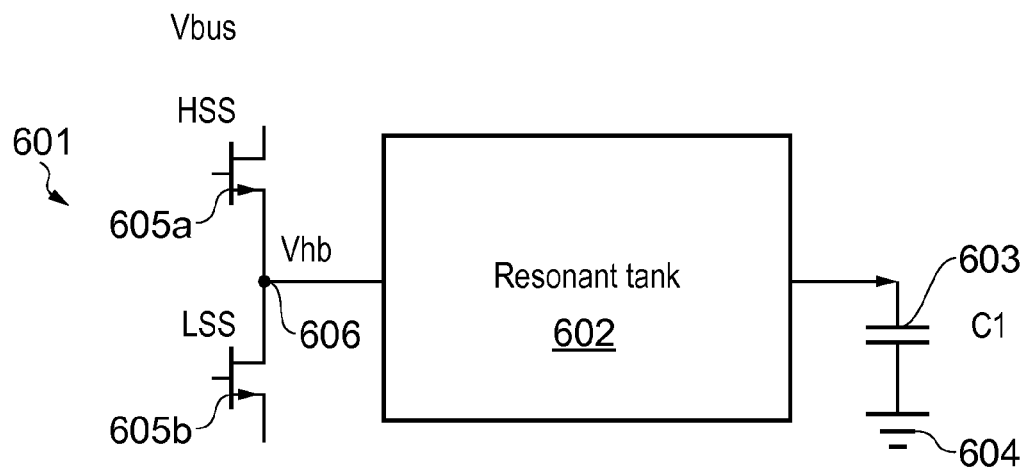
FIG. 6a is a general schematic diagram of a resonant converter.

A general diagram of a resonant converter with half bridge driver, resonant tank and capacitor in series with the current path in the resonant tank is illustrated in FIG. 6a to show the general concept of the invention. In line with the charge principle (P=Cr×deltaV×Fswitch×Vbus), it is not important which type of converter is in the resonant tank 602, while the capacitor Cr 603 functions as a sensing element for sensing charge. Any type of resonant converter that fulfils the requirements of having a switchable series path connected to a voltage supply can be used in combination with the invention. A full bridge may be used as an alternative to the half bridge 601 illustrated. The capacitor C1 603 can be a part of the resonant tank 602, but can alternatively be a separate sensing capacitor. The capacitor C1 is preferably connected to ground 604 on one side or in series with the half bridge node 606. The level for deltaV may be set based on the voltage Vcr across the capacitor 603 as sampled at the beginning of a conduction cycle for each of the switches 605a, 605b. This would provide the same steady state power as using the Vcr control method described above, but will tend to behave differently for transient operation.

Figure 6B:
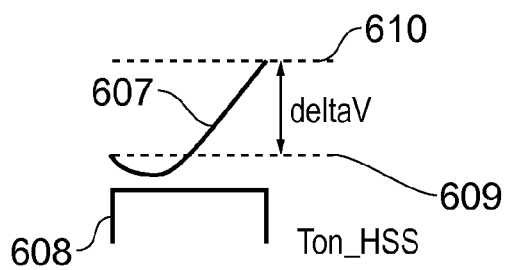

A simplified plot of voltage as a function of time is shown in FIG. 6b for the sensed voltage 607 across C1 603 and how this relates to deltaV and the on time for the high side switching cycle Ton_HSS. At the start of the switching cycle 608, i.e. when the switch HSS 605a is closed, the voltage signal across C1 603 is sampled. The voltage 607 then dips below the sampled voltage level 609 (a result of the direction of the current being reversed at the beginning of the conduction interval, which is needed for soft switching) before rising again until it reaches a higher voltage level 610 given by the sampled voltage level plus deltaV. This triggers the switching signal to fall and the switch HSS 605a to open. The low side switch LSS 605b is then closed (typically after a short delay) and the other half cycle proceeds in the same way, with a different deltaV used. The deltaV used for the LSS half cycle may be equal and opposite to the deltaV for the HSS half cycle, for example during steady state operation at a 50% duty cycle. Under other conditions, for example during startup or a change of operation, the deltaV for each half cycle may be different. A difference in deltaV can be used to change the DC component of the sensed voltage over multiple cycles.

Using this method of control, there is no need to set a common mode term for Vcr, because only a difference in voltage is used, which is simpler to set. As the common mode term is not needed for taking the decision when to turn the conducting switch off, it eliminates the need for sensing the supply voltage Vbus by a capacitive divider and therefore allows for a simpler implementation. Finally the Vcr_cm term should be defined, in order to get the proper duty cycle. This can be done by a separate loop, for example using the actual duty cycle of the converter and regulating it to a desired duty cycle by adapting Vcr_cm.

Figure 7:
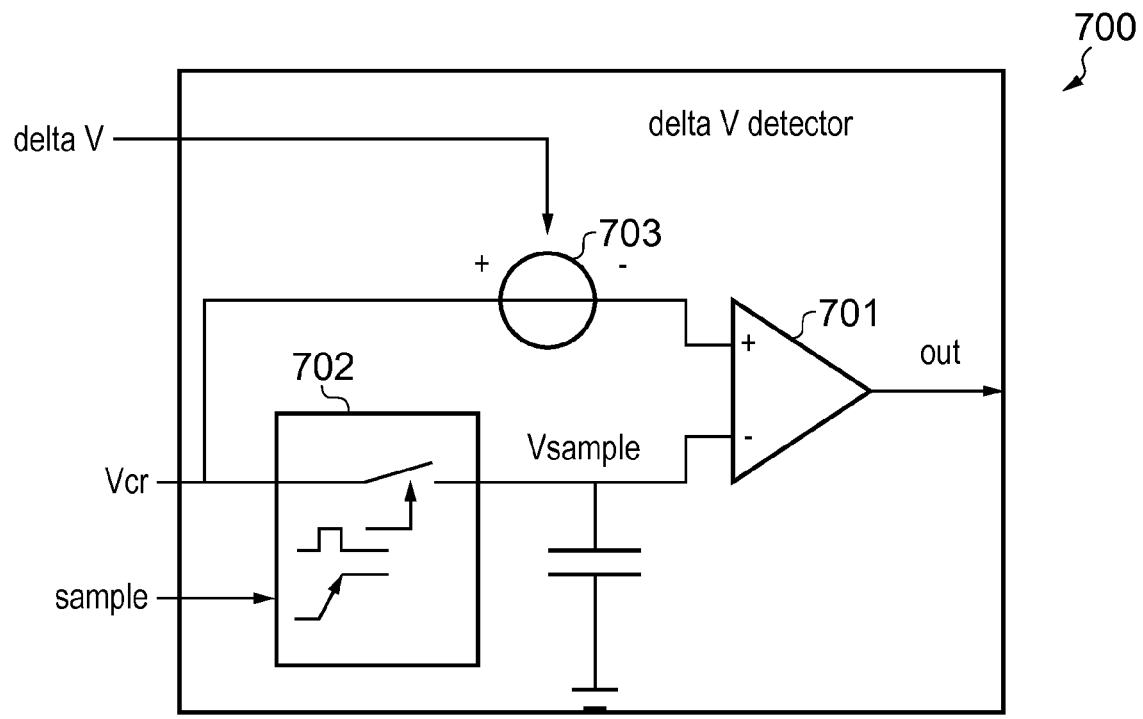
FIG. 7 is a schematic circuit diagram of a delta V detector for a high side switch cycle of a resonant converter.
Figure 8:
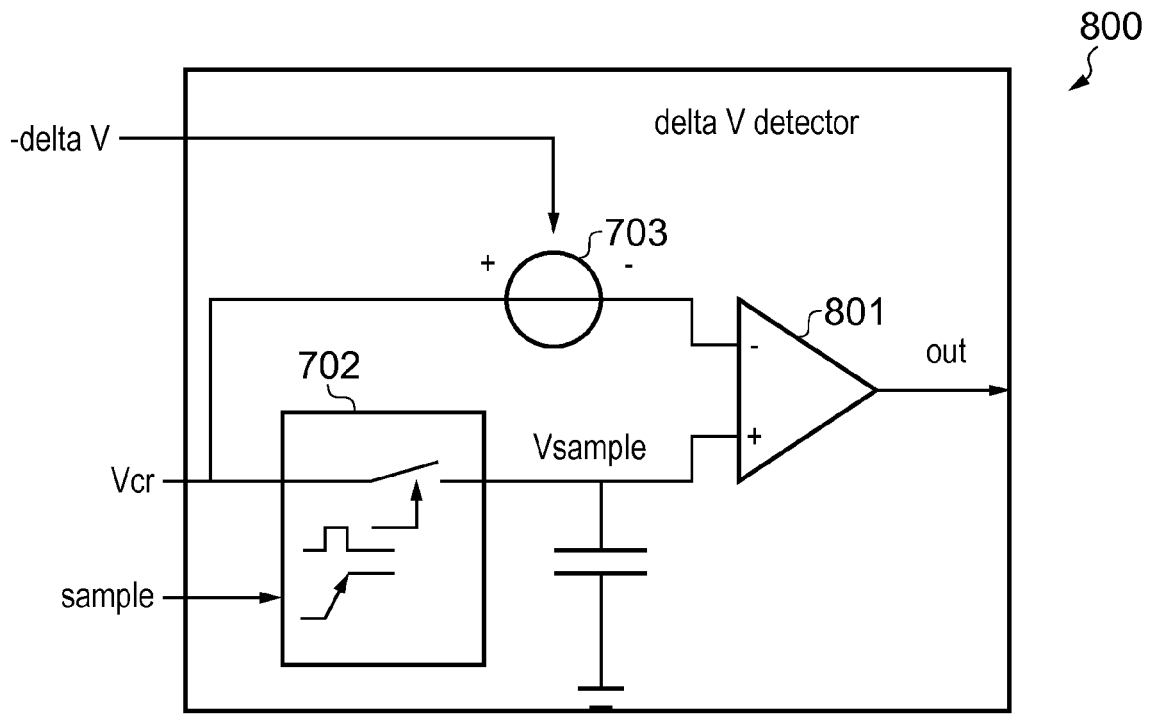
FIG. 8 is a schematic circuit diagram of a delta V detector for a low side switch cycle of a resonant converter.

FIGS. 7 and 8 illustrate schematic circuit diagrams for an exemplary detector for generating a timing signal based on an input deltaV signal. The detectors 700, 800 comprises a comparator 701, 801, which is configured to compare a sampled value of the capacitor voltage level Vcr with a level given by addition of the capacitor voltage level Vcr with a difference signal deltaV. The capacitor voltage Vcr is sampled by a sampling circuit 702 at the rising edge of a switching signal for one of the switches and is compared with a signal output from a combiner 703 which applies an offset of deltaV to the value of Vcr. The voltage across the sensing capacitor (Vcr) is sampled as result of a sample signal, which indicates the beginning of a conduction cycle. The sampled value of Vcr is then compared by the comparator 701, 801 with the actual value of Vcr offset by deltaV. As there is a polarity difference between subsequent half cycles, deltaV should be positive (FIG. 7) or negative (FIG. 8) depending on which half cycle is occurring. The polarity of the comparators 701, 801 also differs as a result. The exemplary circuits in FIGS. 7 and 8 illustrate one particular way in which switching signals can be provided based on deltaV signals. Variations on these embodiments are also possible within the general scope of the invention, such as by placing the deltaV source after the sampling circuit 702 and comparing the result with Vcr, or by taking Vcap as the inputs for the detector circuits 700, 800.

Figure 9:
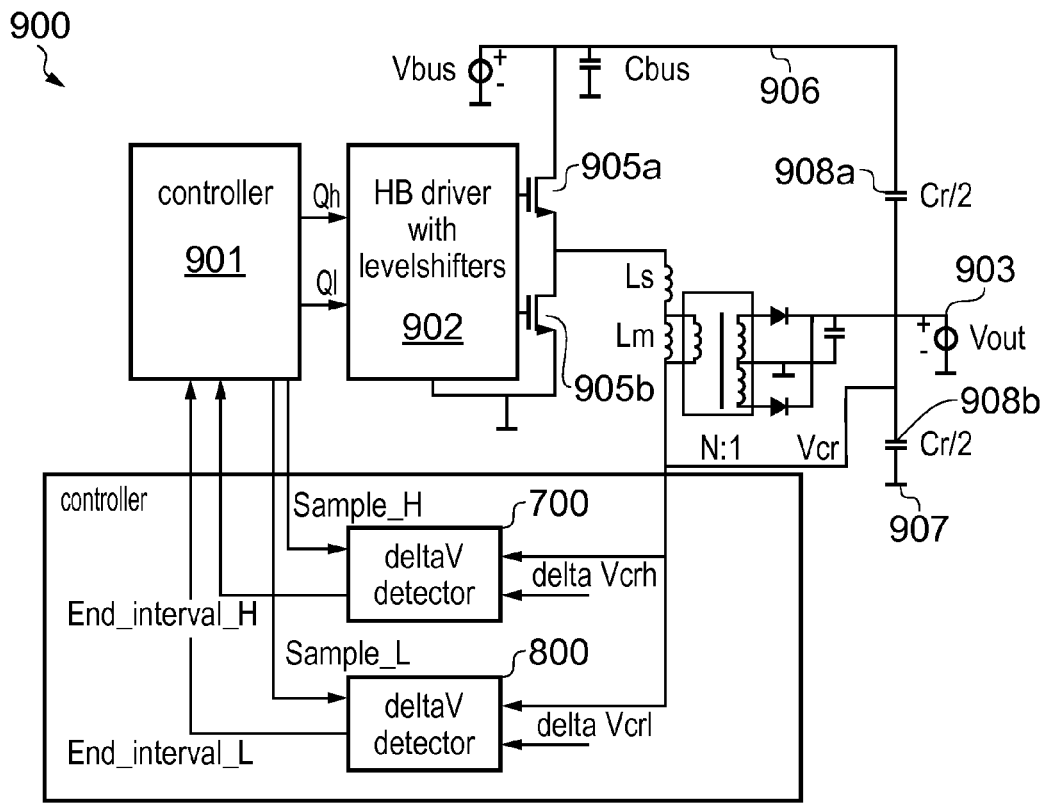
FIG. 9 is a schematic circuit diagram of an LLC converter configured to operate according to an embodiment of the invention.

An exemplary embodiment of a resonant converter 900 incorporating the detector circuits 700, 800 is illustrated in FIG. 9. The converter 900 is in the form of an LLC converter, having a resonance circuit in the primary side circuit comprising inductors Ls, Lm and capacitors Cr/2 908a, 908b connected between a voltage supply line 906 and ground 907. A capacitive divider used to create a low voltage input for the circuitry for defining DeltaVcrh and DeltaVcrl is not shown.

For the converted energy level the DC component of Vcr is not needed as this is set by deltaV only, and can be adjusted by altering a difference between DeltaVcrh and DeltaVcrl. In steady state operation, the magnitudes of DeltaVcrh and DeltaVcrl are set equal to each other.

The converter 900 comprises a controller 901, which takes as inputs the output signals from each detector 700, 800 and outputs sampling signals Sample_H, Sample_L to the detectors. The controller 901 also outputs switching signals Qh, Ql, which are used, in this case by a half bridge driver circuit 902, to drive the first and second switches 905a, 905b.

Figure 10:
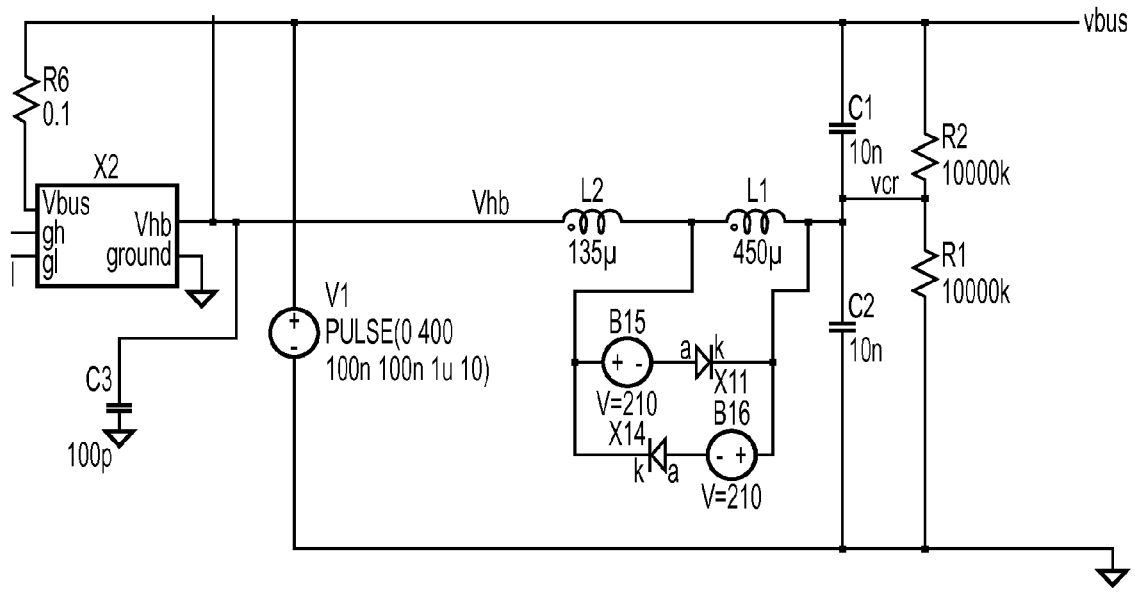
FIG. 10 is a schematic diagram of an equivalent resonant tank for simulating the transformer of a resonant converter.
Figure 11:
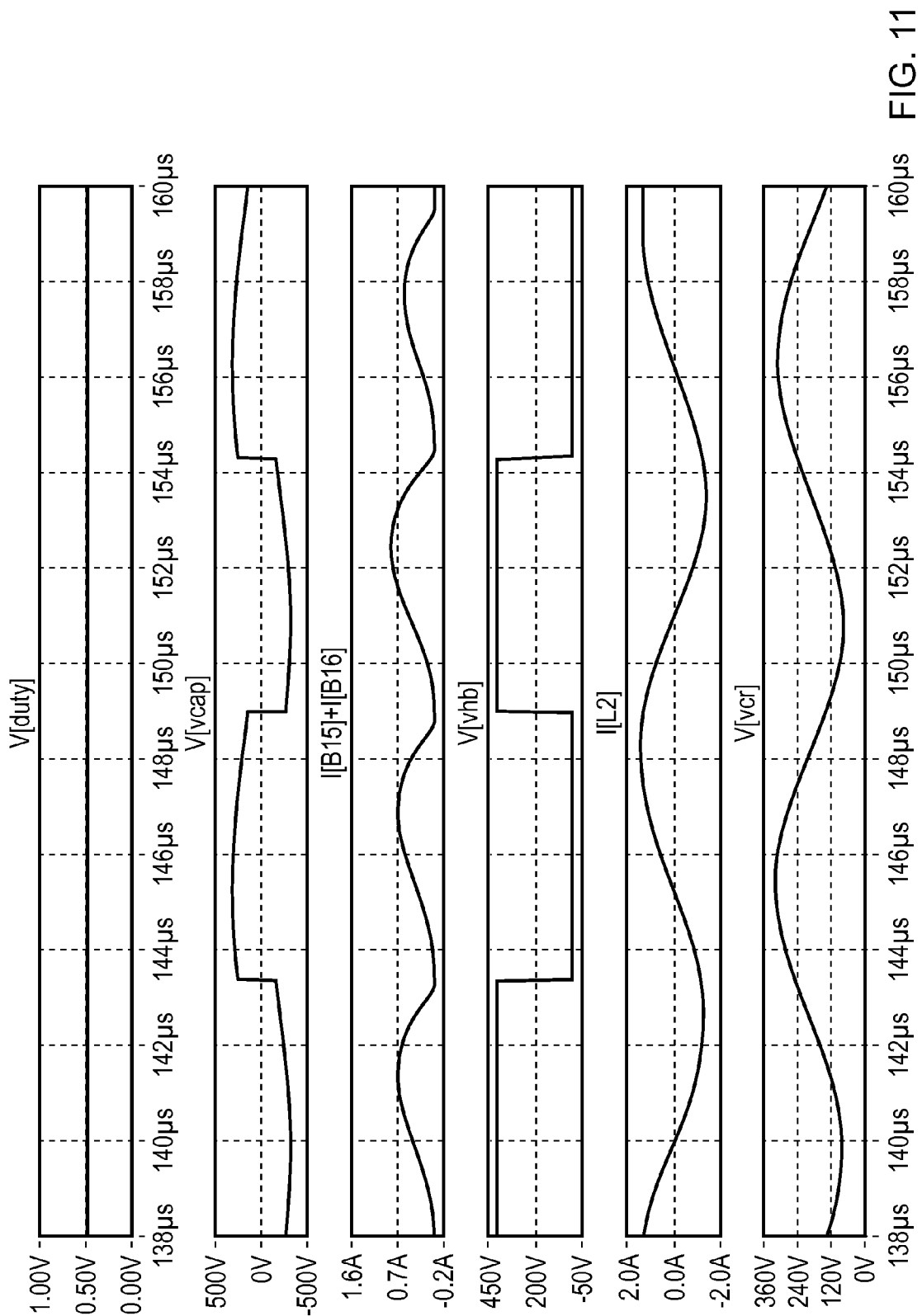
FIG. 11 comprises plots of various voltage and current signals for a simulated resonant converter where equal output current is obtained for both halves of each cycle.
Figure 12:
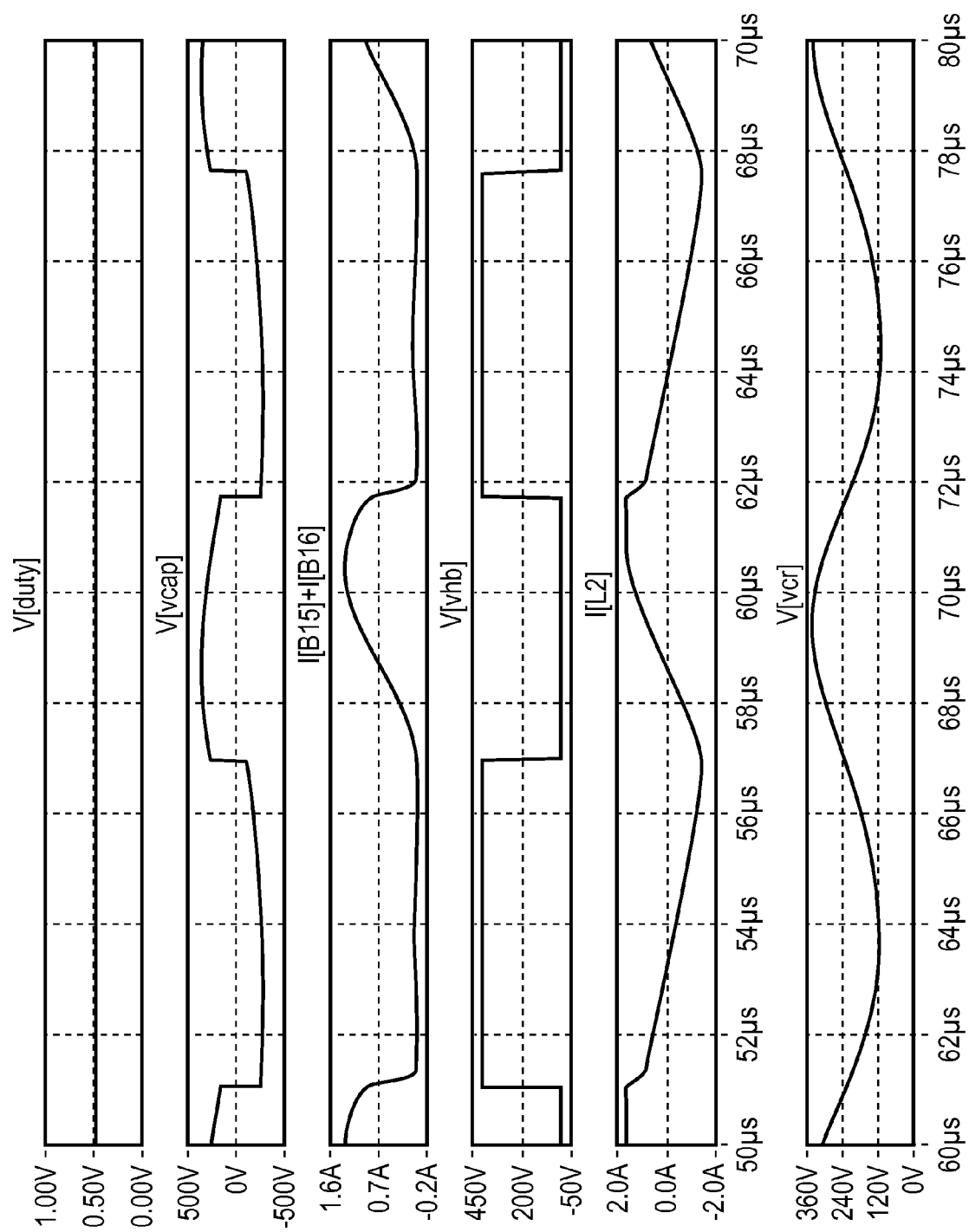
FIG. 12 comprises plots of various voltage and current signals for a simulated resonant converter where unequal output currents are obtained for the halves of each cycle.

The DC component of the signal Vcr, which can be sampled by the voltage signal across the sampling capacitors 908a, 908b, will influence the behaviour of the converter 900, as it also defines how the converted energy is divided between each half cycle. This effect is illustrated in FIGS. 11 and 12, where the converter is supplied from 400V DC, using a converter according to the basic diagram of FIG. 2. In the signals plotted in FIGS. 11 and 12, deltaV is equal for both half cycles, but the DC component is different. The signals in FIGS. 11 and 12 were generated using the simulated resonance circuit illustrated in FIG. 10, which shows details of the resonant tank. In this simulation diagram, the transformer of FIG. 2 is replaced by an equivalent diagram where the output diodes and the output voltage are translated to the primary side and described by sources B15, B16, representing a reflected output voltage (i.e. the actual output voltage multiplied by the turns ratio of the transformer). During one half cycle current flows in source B15 and diode X11 while in the other half cycle current flows in source B16 and diode X14. The current output (also transformed to the primary side) is given by the addition of these two currents, indicated as the plot of I(B15)+I(B16) in FIGS. 11 and 12.

The voltage difference deltaVcr may be made temporarily different for the two half cycles. This creates a shift of the DC component of the sampled voltage Vcr. In this way the DC component can be changed, for example in dependence on one or more criteria.

A suitable criterion can be one that allows the converter to reach a certain result. In most cases this result will be to obtain equal output currents for both half cycles, which is shown in FIG. 11. The desired result could alternatively be to reach a duty cycle of 50% for the half bridge node (for example if only the duty cycle is available for regulation to a symmetrical operation) or, in the case of a multi output converter, to obtain a desired output current for each output. A multi output converter can, for example, be a resonant converter with two independent outputs by having the two output diodes of FIG. 2 connected to respective output capacitors, thereby defining two output voltages, where each output is supplied during opposing half cycles. In such a converter, the criterion can be to regulate by each output a combination of common mode and differential mode terms of deltaVcrh and deltaVcrl in order to regulate to the desired output power for both outputs.

Figure 13:
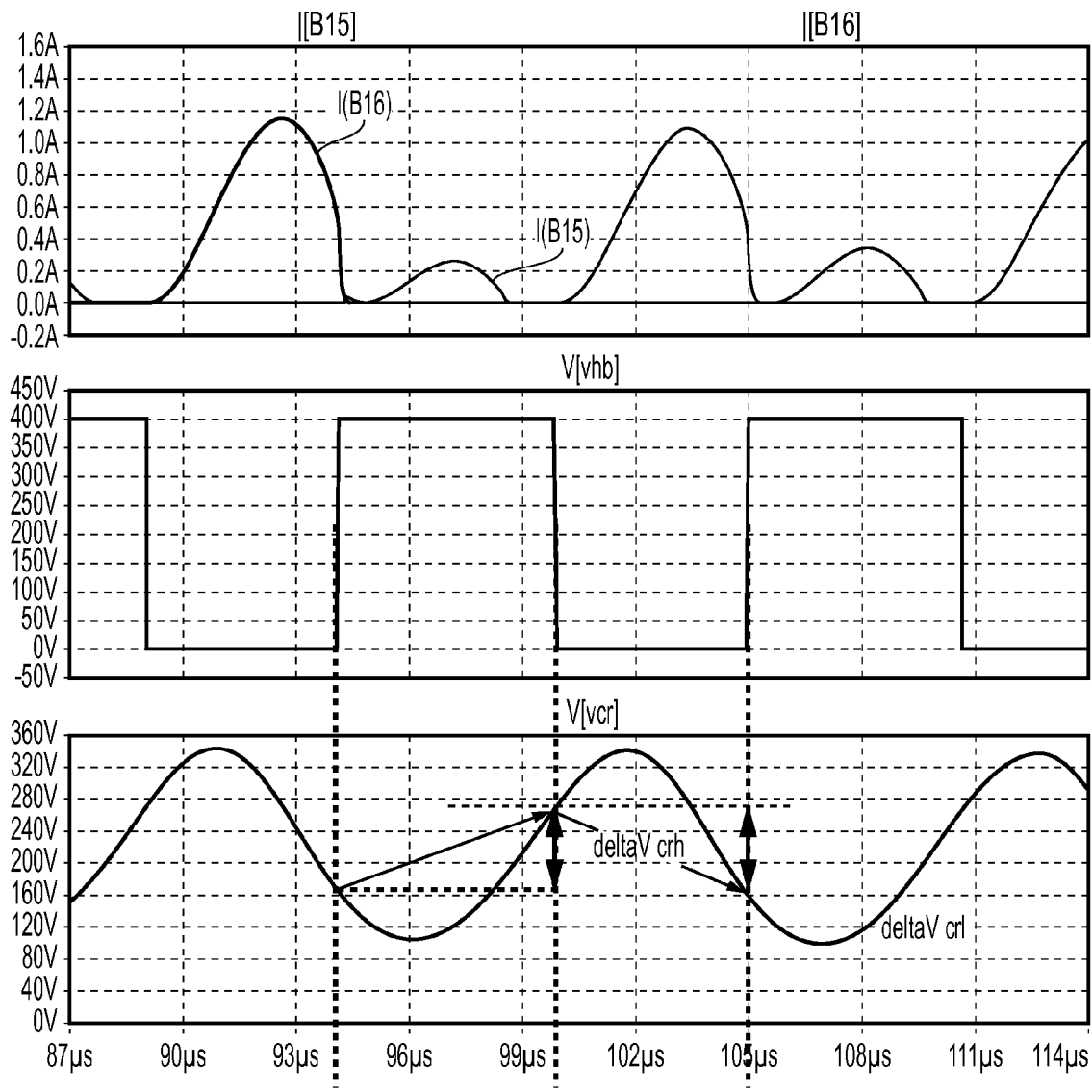
FIG. 13 comprises plots of current and voltage for different points of the simulated circuit of FIG. 10.

In general the signals deltaVcrh and deltaVcrl, as indicated in FIG. 13, can be described in terms of common mode and differential mode terms (vcm,vdm), i.e.:

$$\text{Delta}Vcrh = vcm + vdm$$

$$\text{Delta}Vcrl = vcm - vdm$$

This results in:

$$vdm = (\text{Delta}Vcrh - \text{Delta}Vcrl)/2$$

$$vcm = (\text{Delta}Vcrh + \text{Delta}Vcrl)/2$$

In steady state, vcm should be zero, giving DeltaVcrh=−DeltaVcrl, therefore the sensing capacitor is not being charged or discharged over a longer time and maintains the same DC value.

When the converter needs to adapt to a new operating point for the DC value, for example because the currents for both halfcycles are different due to asymmetry in the transformer or to a desired-for asymmetry, this can be realized by temporarily making the vcm term not zero, thereby resulting in DeltaVcrh and DeltaVcrl being unequal and the sensing capacitor being charged or discharged over a longer time to a new DC level.

Figure 14:
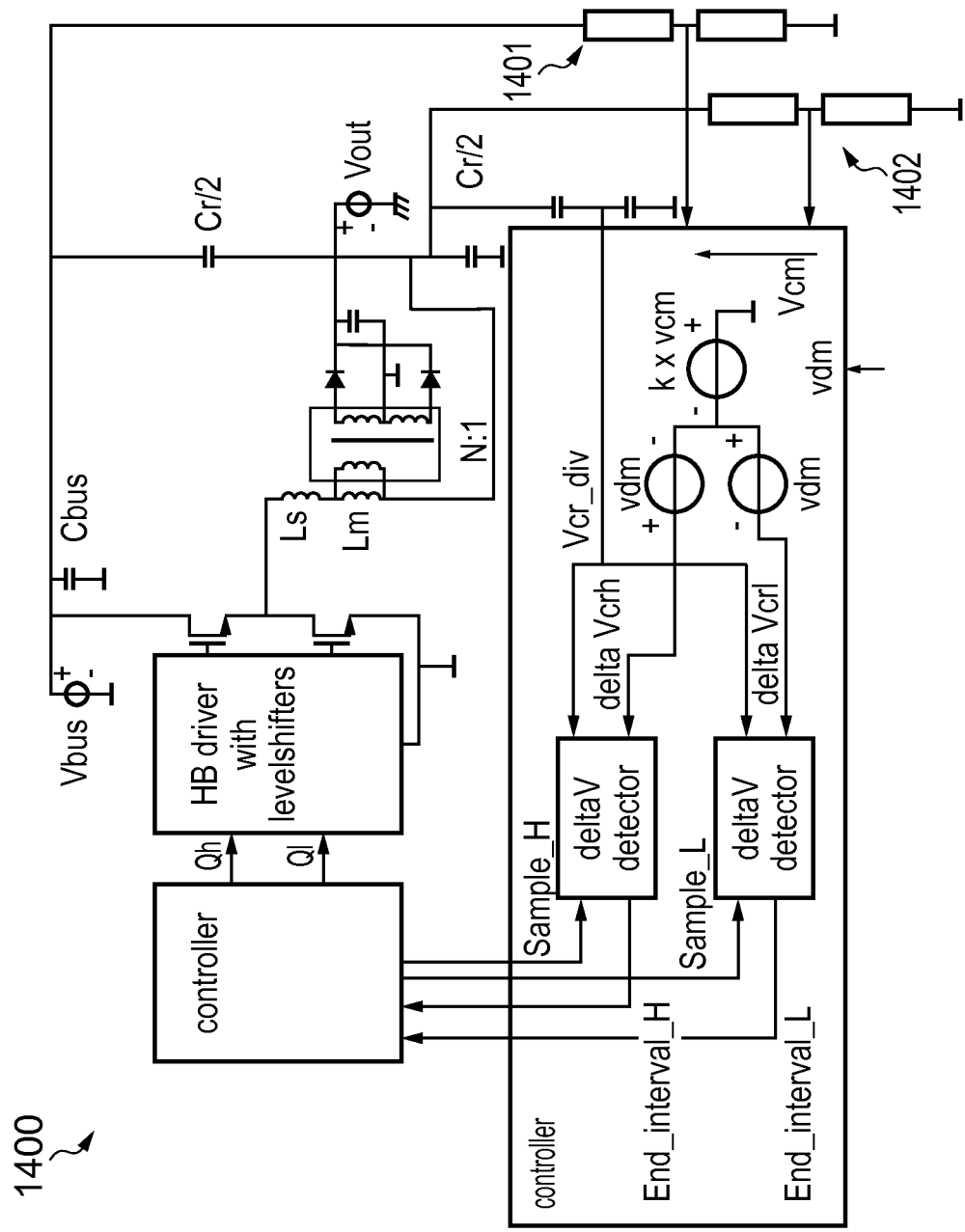
FIG. 14 is a schematic circuit diagram of an LLC converter configured to operate according to a further embodiment of the invention.

An embodiment of a converter 1400 with one output according to the LLC type converter of FIG. 2 is illustrated in FIG. 14. In this embodiment, the DC component of Vcr is directly regulated to the desired level by comparing it to a difference between the supply voltage Vbus and the voltage at the resonant capacitor with respect to ground. This is achieved in this case by dividing each voltage by resistive dividers 1401, 1402. The resulting voltage signal Vcm is input to the detectors offset by a voltage signal Vdm. Other components of the converter 1400 are as described above in relation to the embodiment of FIG. 9.

Figure 15:
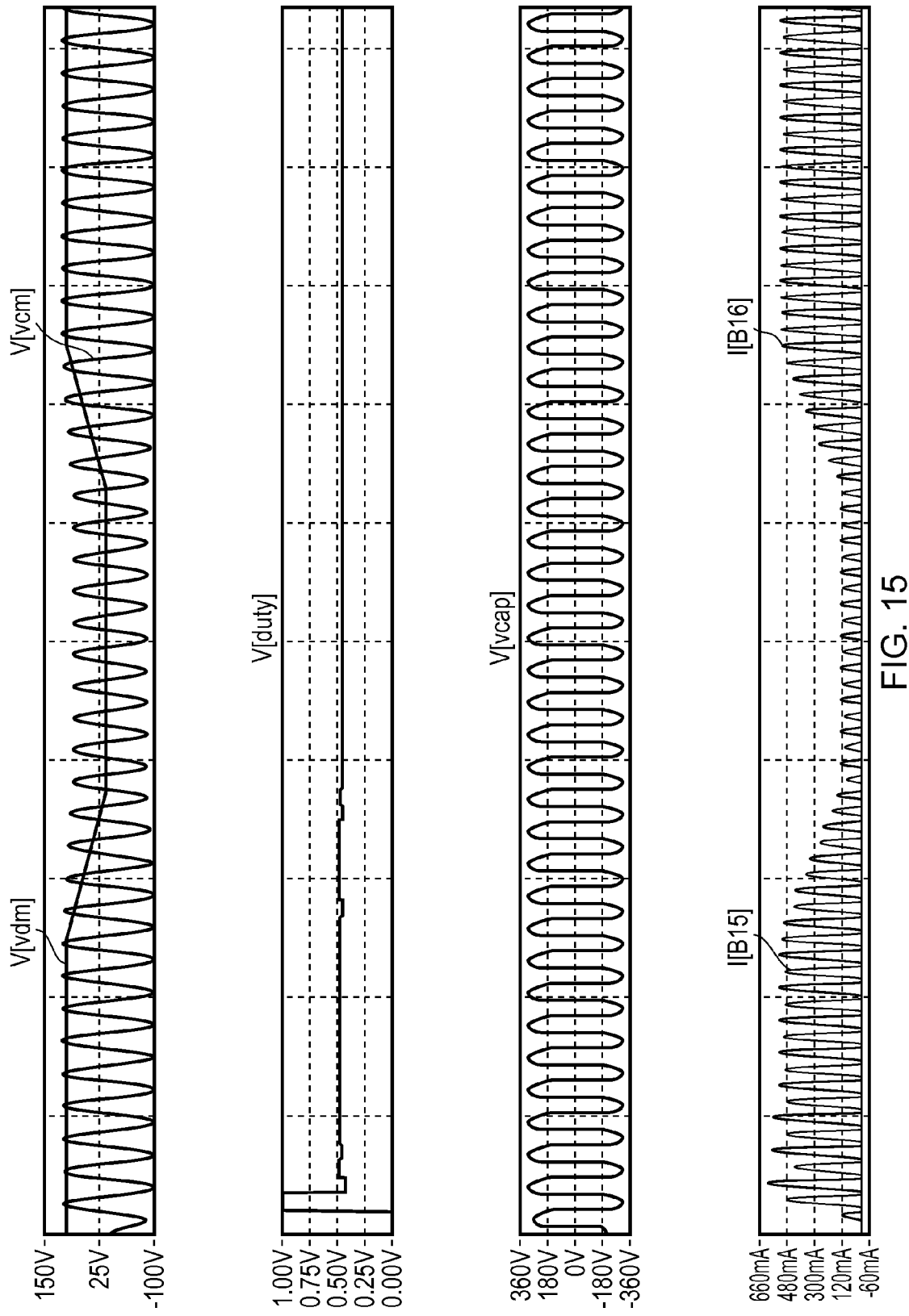
FIGS. 15, 16 and 17 comprise plots of various voltage and current signals for an exemplary resonant converter.
Figure 15:
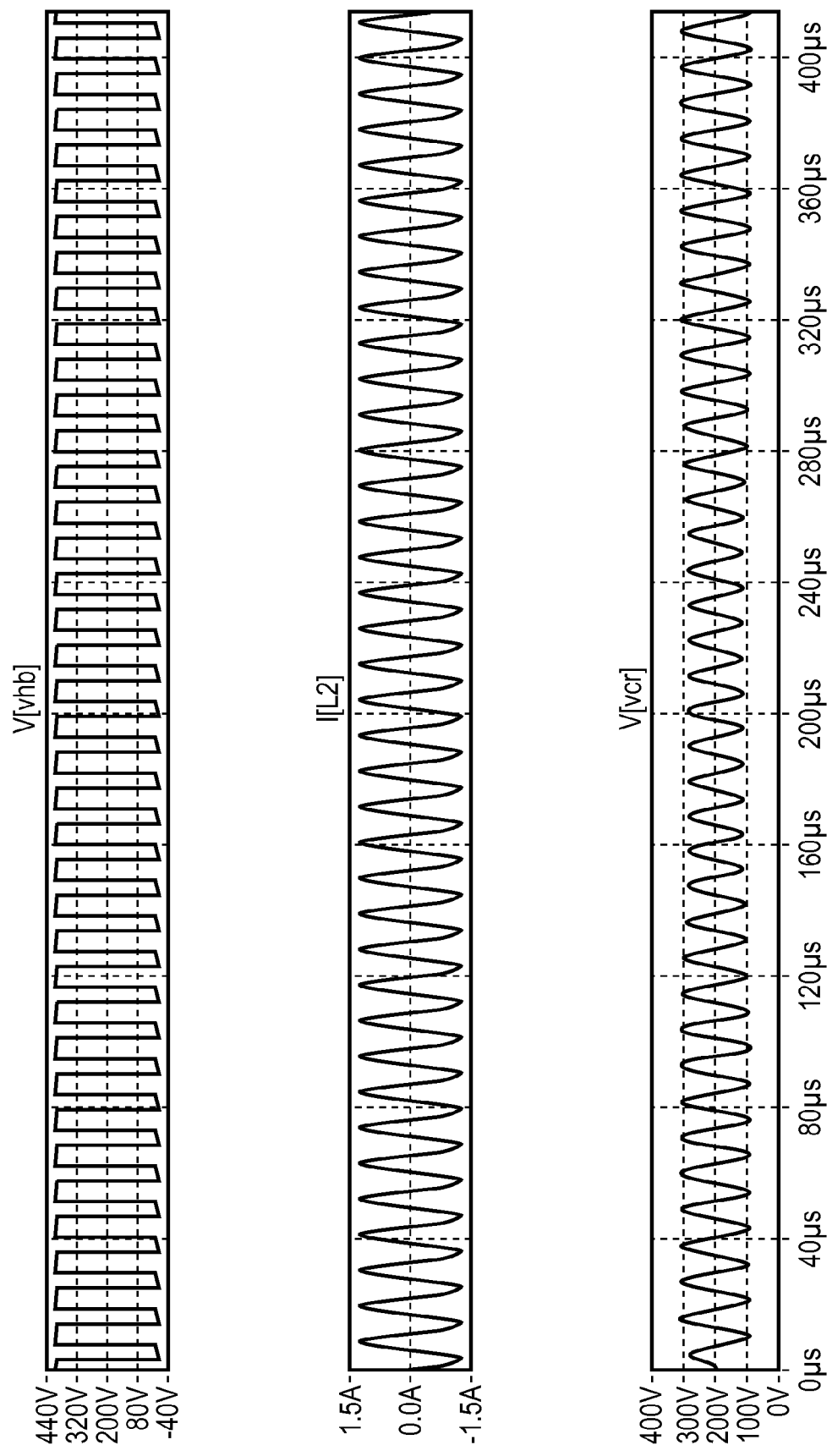

In the simulation result shown in FIG. 15, which relates to the embodiment of FIG. 14, the DC component V(vdm) of the sensing capacitor is regulated to a value of half of the supply voltage of the resonant converter, giving a 50% duty cycle and approximately equal output currents I(B15), I(B16) for both half cycles. The power output of the converter is adapted by changing vdm as can be seen from the upper plot in FIG. 15 showing a variation in vdm, which results in a change in the output currents. In this example vdm is directly defined and not determined by a feedback loop from the secondary side regulation, which would be done in a practical application with a regulated output.

The voltage signal vcm also includes the AC signal of Vcr, as can be seen in the top most plot of FIG. 15. As this AC term is correlated with Vcr and also influences the momentary value of deltaVcrh and deltaVcrl, a slight change in output power occurs. This is in most cases not a significant issue. If desired this can be improved for example by averaging the signal vcm over a complete switching cycle so as to extract only the DC component.

Figure 16:
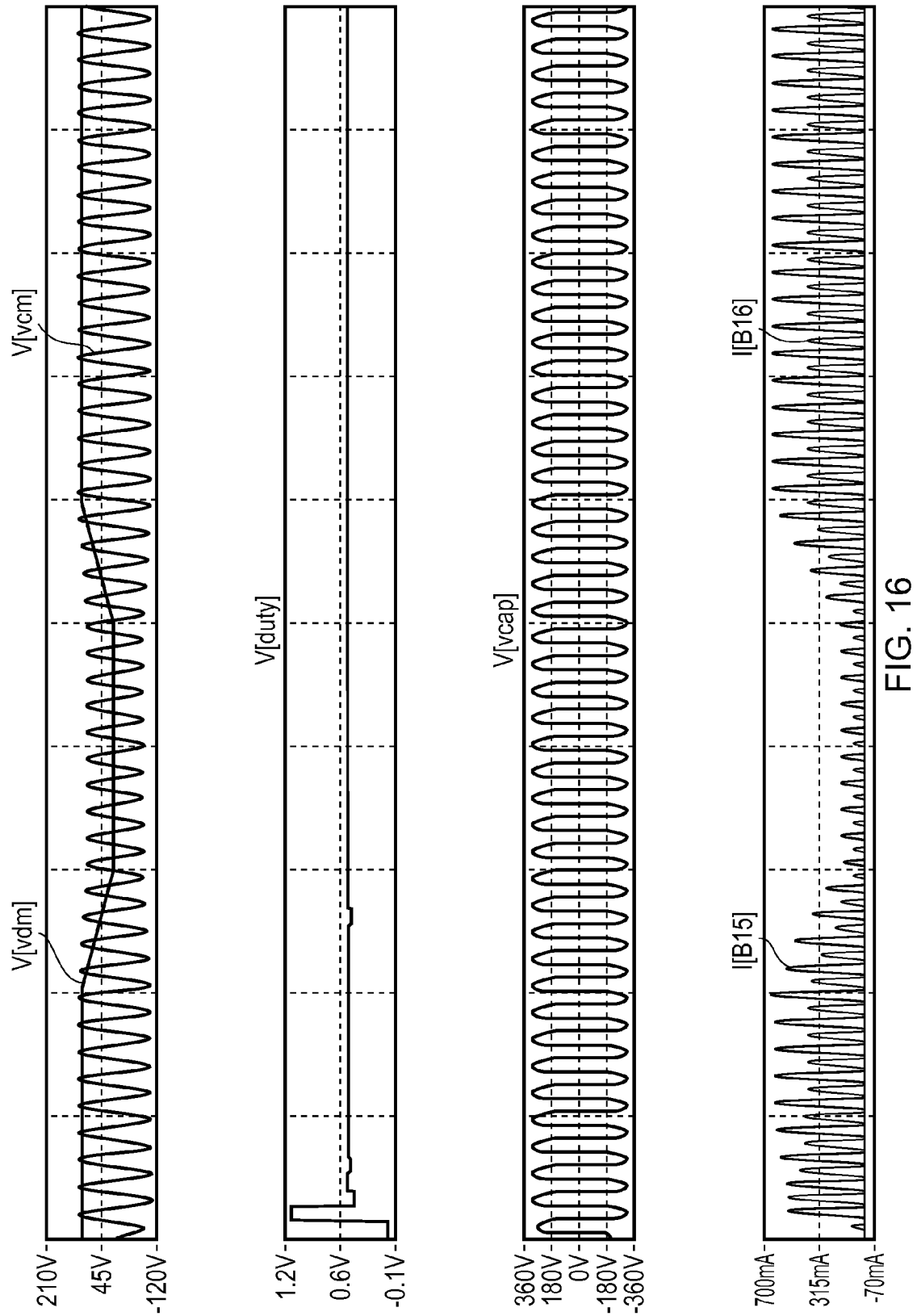
Figure 16:
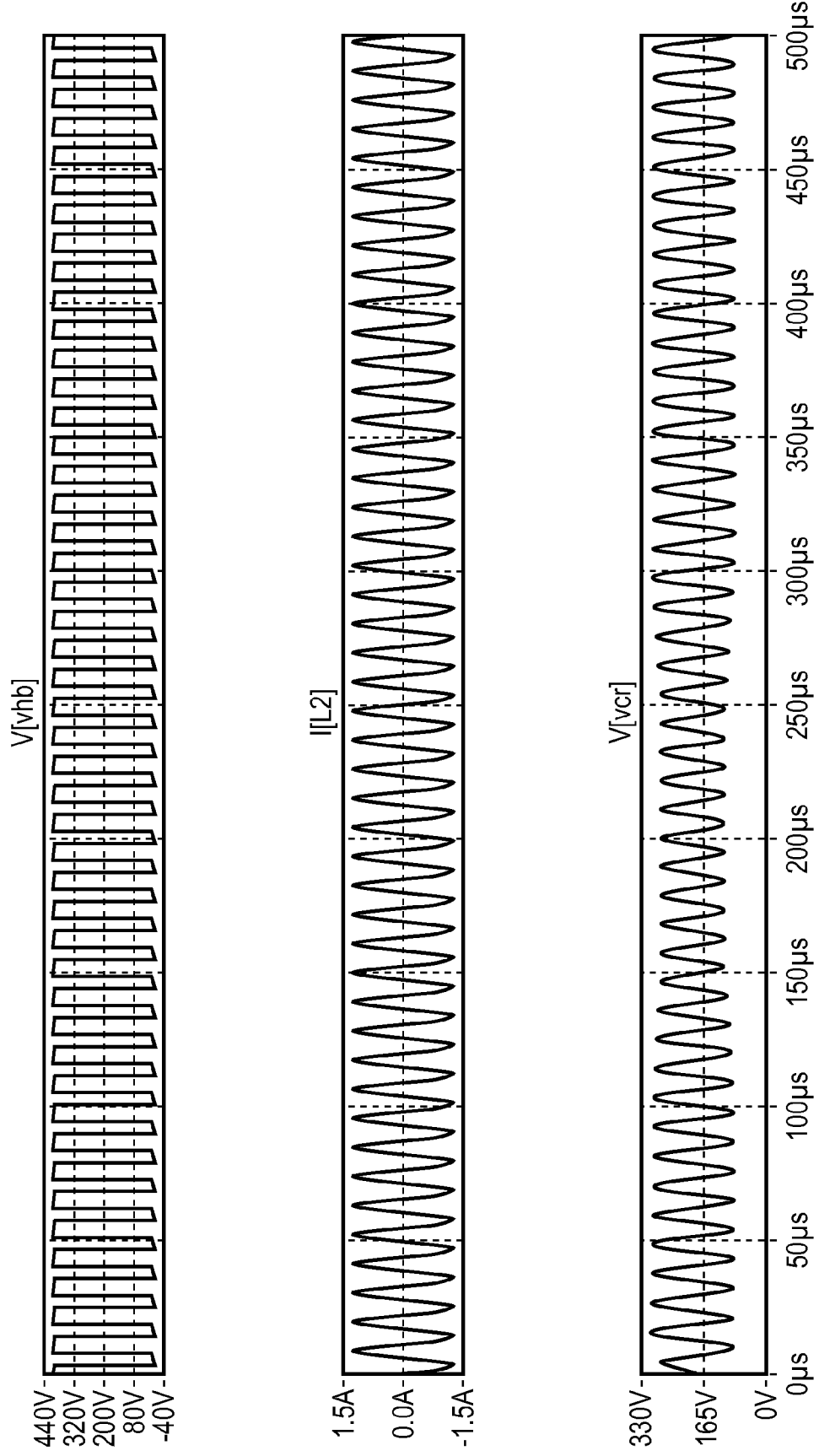

FIG. 16 shows a similar set of plots of voltage and current signals as in FIG. 15, but with a 2% mismatch between the resistive dividers 1401, 1402. The result of this is that the DC component is regulated to a value that is 2% different from the desired value. This results in a difference between the output currents I(B15), (B16) during both half cycles.

Figure 18:
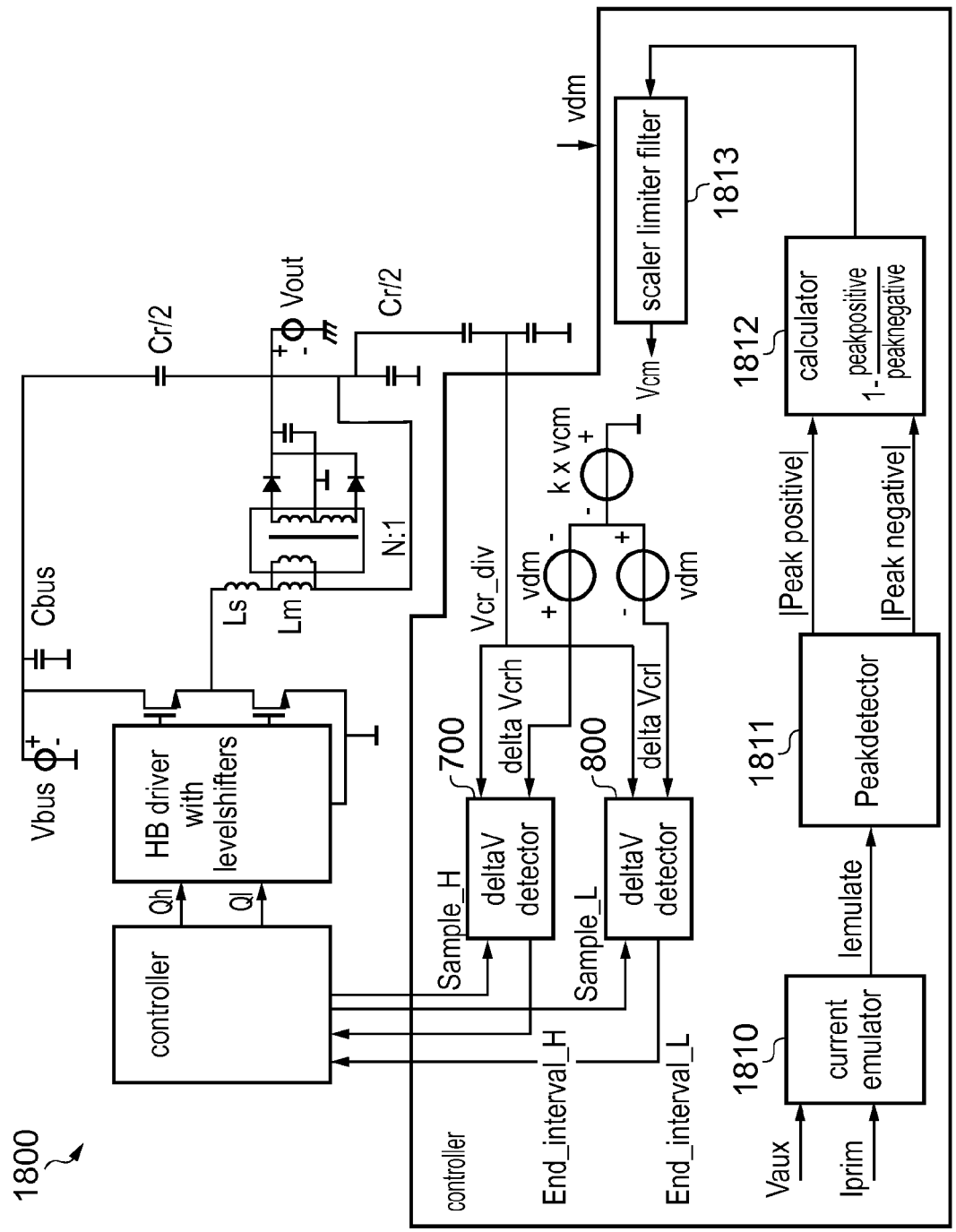
FIG. 18 is a schematic circuit diagram of a further exemplary embodiment of a resonant converter.

In an alternative implementation, the actual output current (or an emulated version of the output current) may be used to regulate to the proper DC component. An embodiment of a converter 1800 using this principle is illustrated in FIG. 18. For sensing the output current, a current emulator 1810 is used, the details of which are described in WO 2008/104919. The use of an emulator is preferred because sensing the output current directly can result in problems due to mains isolation and generally high current levels, resulting in RMS losses using sense resistors to sense the current.

Figure 17:
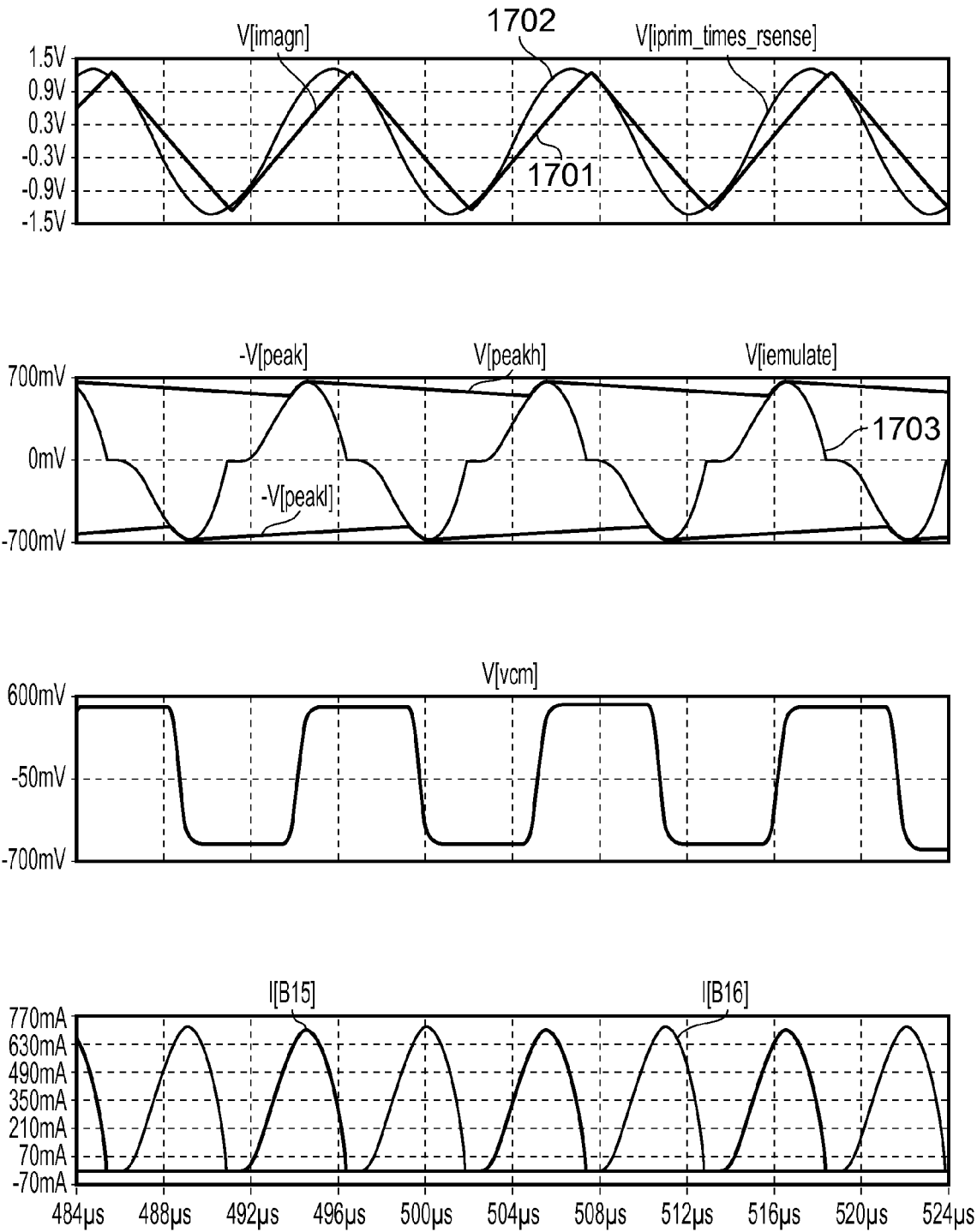

FIG. 17 illustrates plots of current and voltage signals for the converter 1800 of FIG. 18. The voltage signal iprim_times_rsense 1702 is the voltage across a sense resistor connected to sense the primary current and further amplified by an amplifier. The voltage signal imagn 1701 is the integral of the voltage across an auxiliary winding of the transformer, and represents the shape of the magnetizing current in the transformer. When scaled, the difference between these two signals represents the shape of the output current of the converter, shown in FIG. 17 as signal V(iemulate) 1703, which is output by the current emulator 1810. This signal is processed by a peak detector 1811 to derive two signals representing the peak value during the positive and negative parts of each cycle. The ratio between these signals is an accurate representation of the symmetry between both contributions to the output current I(B15) and I(B16), shown in the lower plot of FIG. 17.

The two peak signals output by the peak detector 1811 are processed by a calculator block 1812 and a signal is generated with a value representing the deviation of this ratio compared to 1. A possible implementation is to use an equation 1−|peakpositive|/|peaknegative|. Other equations may alternatively be used. The signal output by the calculator block 1812 representing the deviation of the peak ratio compared to 1 is then further processed, for example by being limited, scaled and filtered by a scaling block 1813, to generate the signal vcm. The signal vcm is then used as the input to the detectors 700, 800, as with the embodiment of FIG. 14.

Figure 19:
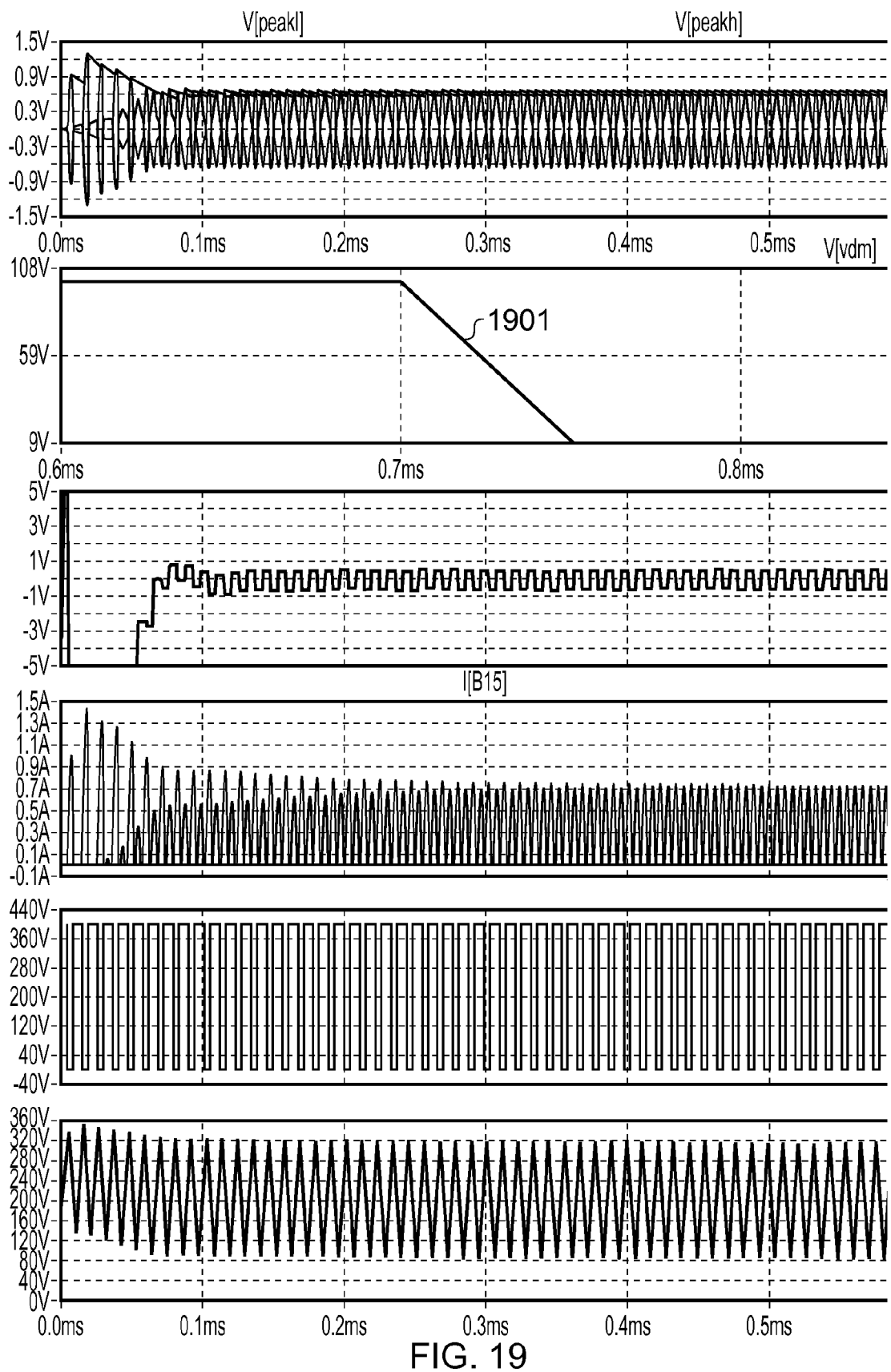
FIG. 19 indicates various voltage and current signals in the resonant converter of FIG. 18 during operation.
Figure 19:
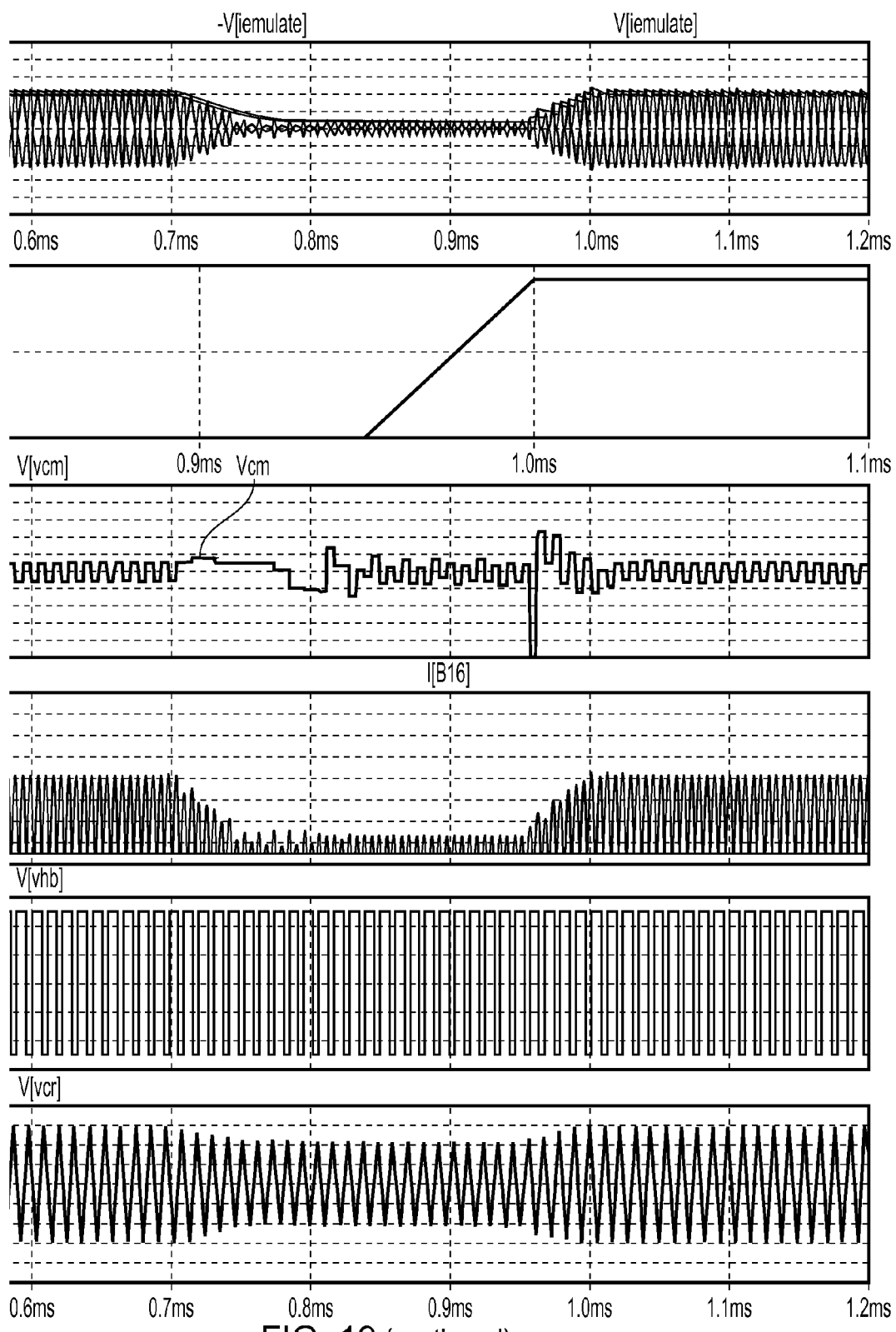

A simulation result of the embodiment of FIG. 18, in the form of voltage and current signals, is given in FIG. 19. At t=0, a common mode loop adapts Vcm in order to obtain symmetrical operation. At t=0.7 ms, a step in power is given by adapting the signal vdm 1901. The signal Vcm 1902 adapts the DC voltage, but only a small adaption is needed, because a change in power hardly influences the DC voltage. At t=0.95 ms an opposite step in power is given showing that the symmetrical operation is maintained. The time scale in the plot of the voltage signal vdm 1901 is expanded compared with the other plots.

In the embodiment illustrated in FIG. 18, direct sensing of Vbus or indirect sensing of Vbus via a capacitive divider is not required, thereby having the advantage of requiring fewer components in the resonance circuit and having less dissipation which is important for efficient operation at low load.

Beside embodiments using a 50% duty cycle control or an asymmetrical control as explained above, aspects of the invention can also be used in combination with various special operating modes, for example as disclosed in WO 2009/098640. As an example, in FIG. 2 of that document, reproduced as FIG. 20 in the appended drawings, a low power mode relating to an LLC converter (for example of the type illustrated in FIG. 2 of this application) is described, where a complete operating cycle consists of one high side switch conduction interval and two low side switch conduction intervals in a certain timing sequence.

The operating modes described above may also be represented as state plane representations, where the primary current (which may be appropriately scaled with the characteristic impedance of the resonant tank to result in circular trajectories) is plotted against the voltage across the resonant capacitor. The voltage across the resonant capacitor can directly be used to control the converter according to the capacitor voltage control method (vcr is then the voltage across the resonant capacitor). The state plane representation is useful here as it directly shows what happens with vcr and therefore with the deltaVcr method.

Figure 20:
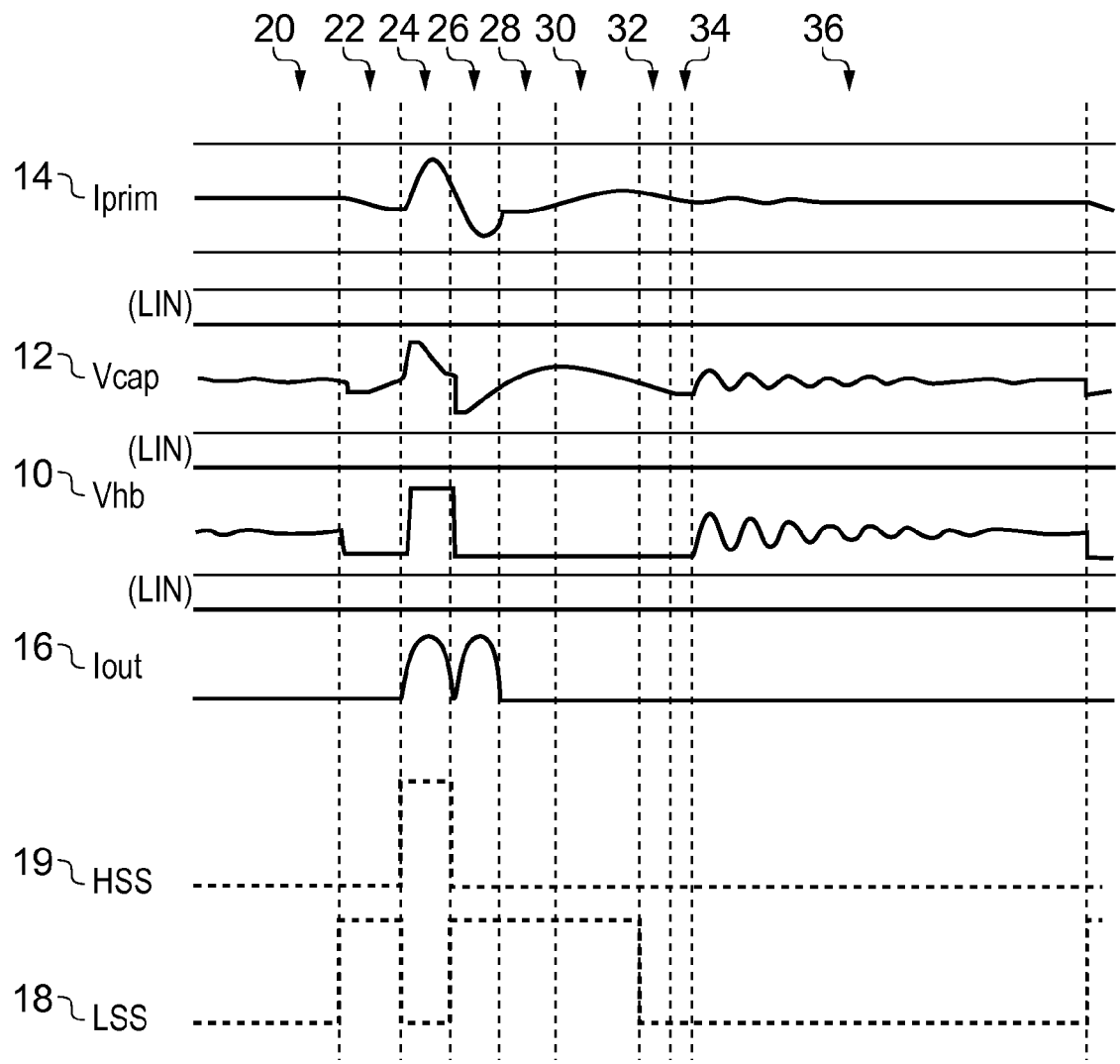
FIG. 20 indicates various voltage and current signals over an operating cycle of a prior LLC converter.
Figure 21:
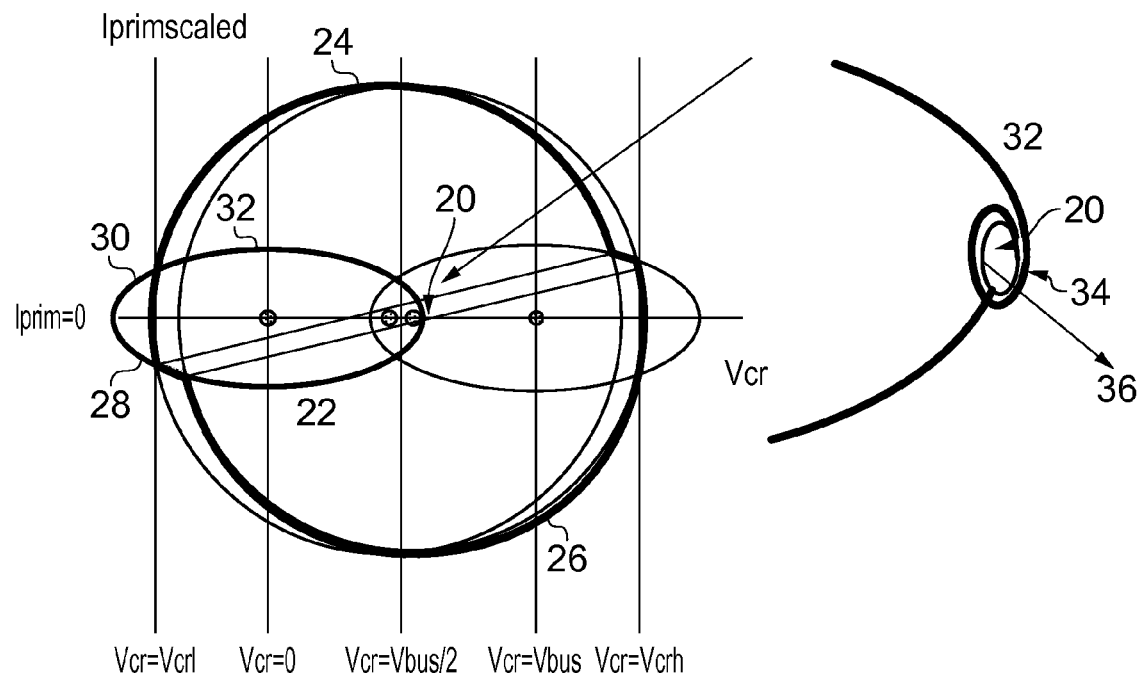
FIG. 21 is a state plane representation of the signals of FIG. 20.

FIG. 21 illustrates a state plane representation of the timing sequence of FIG. 20. The trajectory is followed clockwise. The steady state sequence of trajectory 24, 26 is followed in a symmetrical 50% duty cycle mode according to the plots of FIG. 15 (which may be considered to be a 'high power mode'). The high side switch conduction interval ends when Vcr crosses Vcrh and the low side switch conduction interval ends when Vcr crosses Vcrl. Using deltaVcr control according to the invention, Vcrh and Vcrl are not set independently, but set directly as result of each other and the deltaVcr value set, so $Vcrh_n = Vcrl_n + deltaVcr$ followed by $Vcrl_{n+1} = Vcrh_n - deltaVcr$, where n is the actual cycle number. This results in a difference in the behaviour of the converter in relation to how the converter iterates to a steady state solution after a transient.

Now looking to a low power mode, in FIG. 21 an extra trajectory is inserted within the high power mode trajectory 24, 26. For example, at the end of trajectory 26, the elliptical trajectory is not left at Vcrl, but is further followed along trajectory 28 (until Iprim=0) and then along trajectory 30. The end of trajectory 30 is the moment when the low side switch is turned off (taking place at the Iprim>0 halfplane, preferably close to point 20). When the low side switch is turned off at Iprim>0, the body diode of the LSS takes over conduction, resulting in the LSS effectively staying on and continuing to follow the elliptical trajectory 32 until Iprim=0 is reached. Then the body diode turns off, but due to reverse recovery effects, Iprim becomes slightly negative (34) before the body diode is off and trajectory 36 is finally reached, being a small resonance giving a spiral towards point 20, where the system can stay for an extended time before continuing with the next trajectory 22.

Turning back to the invention, state plane diagrams can be used to see how the deltaVcr criterion can be extended with respect to operating the converter in a low power mode.

Starting with interval 24, $Vcrl_n$ is set as result of the previous cycle. The next step is to set $Vcrh_n = Vcrl_n + deltaVcr$ similarly to the high power mode of operation in order to finish interval 24. The next step is to define $Vcrl_{n+1} = Vcrh_n - deltaVcr$ at the end of trajectory 26. The low power mode includes an extra trajectory inbetween, during which the high side switch is kept on, turned off and turned on again. This means that according to the invention, $Vcrl_{n+1} = Vcrh_n - deltaVcr$ is still valid, but with the extension that other trajectories can be placed inbetween. The start and end of such additional trajectories may also be determined based on signals Vcrl and Vcrh and a related difference signal deltaVcr or a different criterion.

There are several variations possible on these additional trajectories, such as:

Repeating trajectory 24, 26 multiple times before entering trajectories 28, 30, 32, [34, 36], 20, 22 (the intervals in brackets being optional, depending on the particular method of control), thereby repetitively applying the deltaVcr criterion in between; and Within trajectory 28, 30, 32, [34, 36], 20, 22, skipping portions 32, 34, 36, 20 (i.e. keeping the low side switch on) and repeating portions 28, 30, 22 before following trajectory 24.

Another extension is to include another trajectory according to WO 2009/098640 known as an energy dump. Using the energy dump method, the low power mode trajectory of FIG. 21 is extended with an energy dump interval where, at some point within the interval 26, 28, the low side switch is turned off for a short time period. This allows energy to be delivered back from the resonant tank to the load (and sometimes also to the supply). If this is done within interval 26 it is called a continuous mode energy dump. If done within interval 28 it is called a discontinuous mode energy dump. The term 'continuous' refers to the state of the secondary diode when starting the energy dump interval, which is conducting (i.e. continuous) during interval 26 and not conducting (discontinuous) during interval 28.

Figure 22:
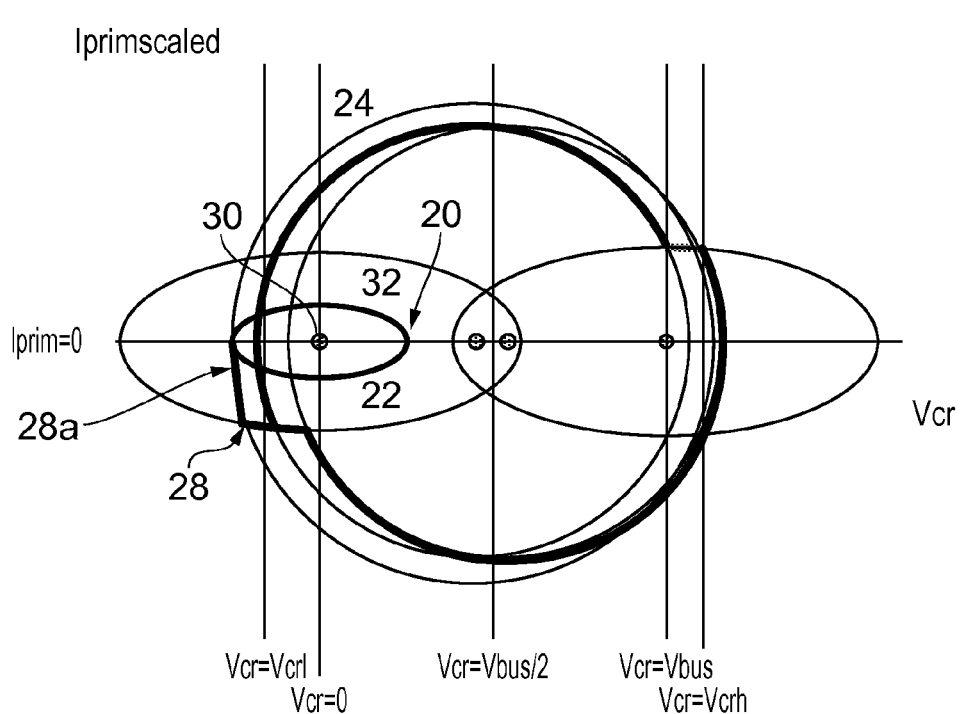
FIG. 22 is a state plane representation of a discontinuous mode energy dump operation.

An example of the discontinuous mode energy dump is illustrated in the state plane diagram of FIG. 22 where an interval 28a is included between intervals 28 and 30, where the low side switch is turned off for a short period. This results in a smaller ellipse 30, 32, [34, 36], 20, 22 and therefore the Vcr=Vcrl crossing is reached at a different current compared to the solution without an energy dump. The smaller area of the ellipse indicates lower magnetizing losses and therefore an efficiency advantage. Under certain conditions after the energy dump pulse it is not needed to follow 30, 32, [34, 36], because interval 20 is then directly reached.

It is also possible to use a symmetrical solution where the timings of the high side switch and low side switch are reversed, which has the effect of mirroring the state plane curves in both the x and y axes.

In another embodiment, using the LLC converter under a low power mode according to WO 2009/098640, the discontinuous current mode (DCM) or continuous current mode (CCM) energy dump method may also be controlled using the deltaVcr method according to the present invention. In this embodiment the moment for starting the energy dump interval 28a is chosen relative to the sampled Vcr at the end of the intervals 26 (or 24 in the complementary embodiment). In order to explain this feature the state plane representation including the feature is given for CCM energy dump, as shown in FIG. 23, and the DCM energy dump in FIG. 24.

Figure 23:
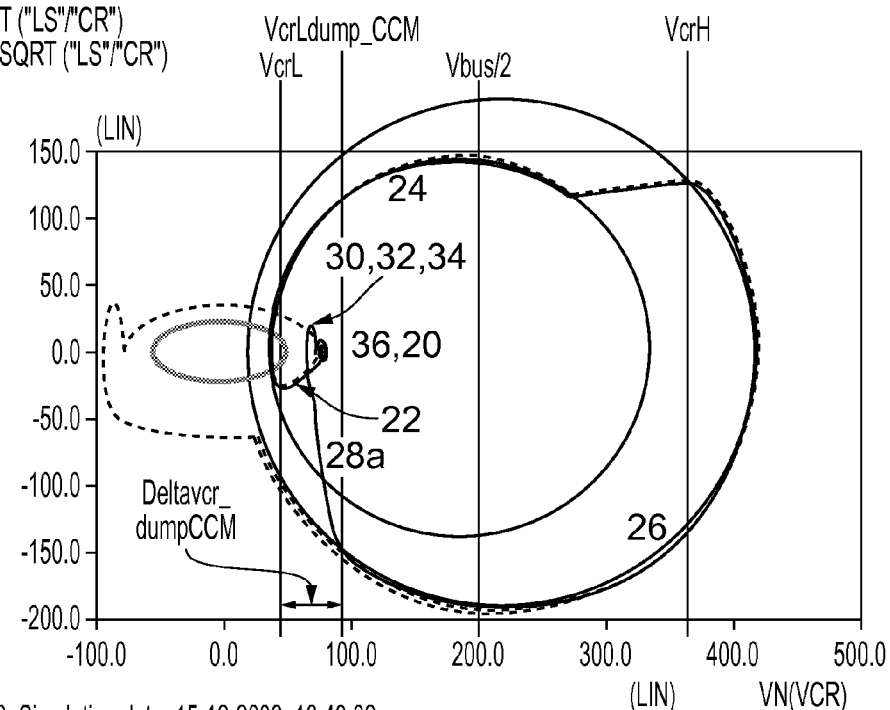
FIG. 23 is a state plane representation of a continuous current mode energy dump operation.

FIG. 23 shows the CCM energy dump method, where a dump interval is started when Vcr crosses the level VcrLdump_CCM. At that moment interval 28a starts, followed by intervals [30], [32], [34], 36. Trajectory 28 is skipped when using the CCM energy dump method.

VcrLdump_CCM can be chosen at a point during the interval 26. This choice directly influences the value of Vcr at the spiral 36, leading to point 20, where the system waits prior to the start of the next conversion cycle. Choosing VcrLdump_CCM at a higher level gives a higher value for Vcr at point 20 and therefore a larger area of the ellipse as part of trajectory 22, which is known as an 'energy recovery interval' as energy stored in the resonant capacitor is then stored back into the magnetizing inductance of the transformer to prepare soft switching when Vcrl is reached and the high side switch is turned on. Choosing VcrLdump_CCM at a higher level therefore gives more magnetizing current and therefore more magnetizing losses and also more switching losses as Vcr at point 20 is also the voltage at the drain of the low side switch at the moment that it is turned on to start interval 22. Choosing VcrLdump_CCM at too low a level means point 20 is at the left side of Vcrl, making it impossible to pick up the desired trajectory 24. There is also a minimum required value for the magnetizing current needed to provide for soft switching when Vcrl is reached. This results in the preference to choose VcrLdump_CCM to be as low as possible, and a preference to choose VcrLdump_CCM in relation to Vcrl.

The value for VcrLdump_CCM may therefore be chosen to be equal to Vcrl+deltaVcrLdump_CCM, where deltaVcrLdump_CCM is an offset voltage.

Figure 24:
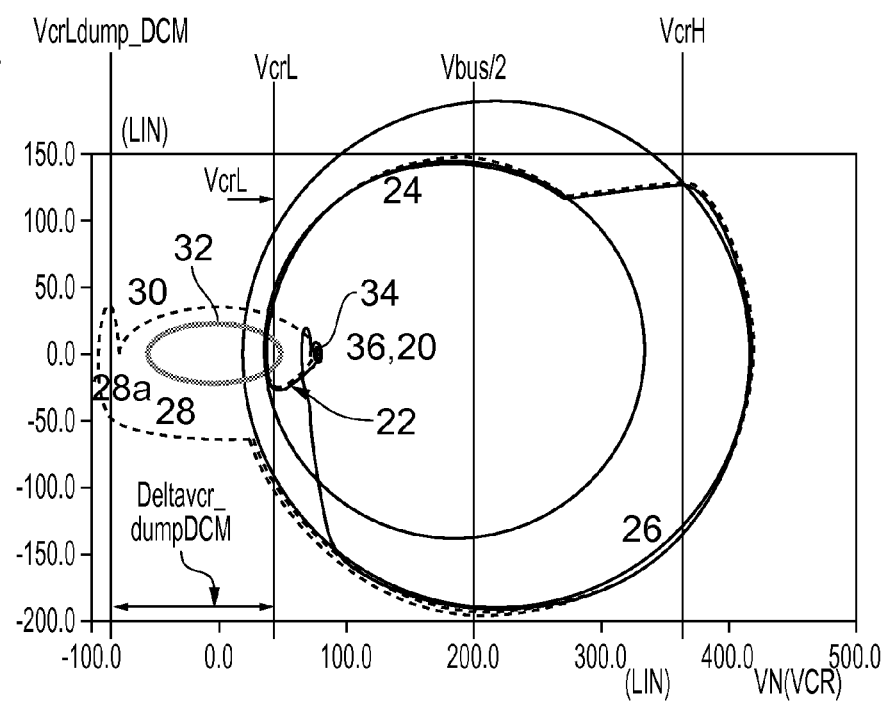
FIG. 24 is a state plane representation of a discontinuous current mode energy dump operation.
Figure 25:
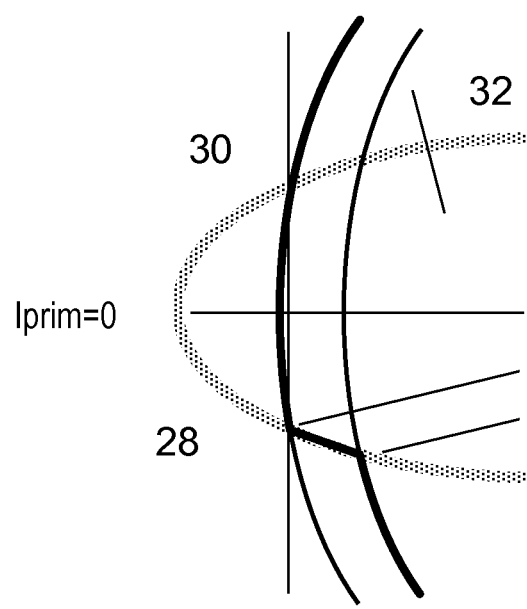
FIG. 25 is a detailed view of the state plane representation of FIG. 21.
Figure 26:
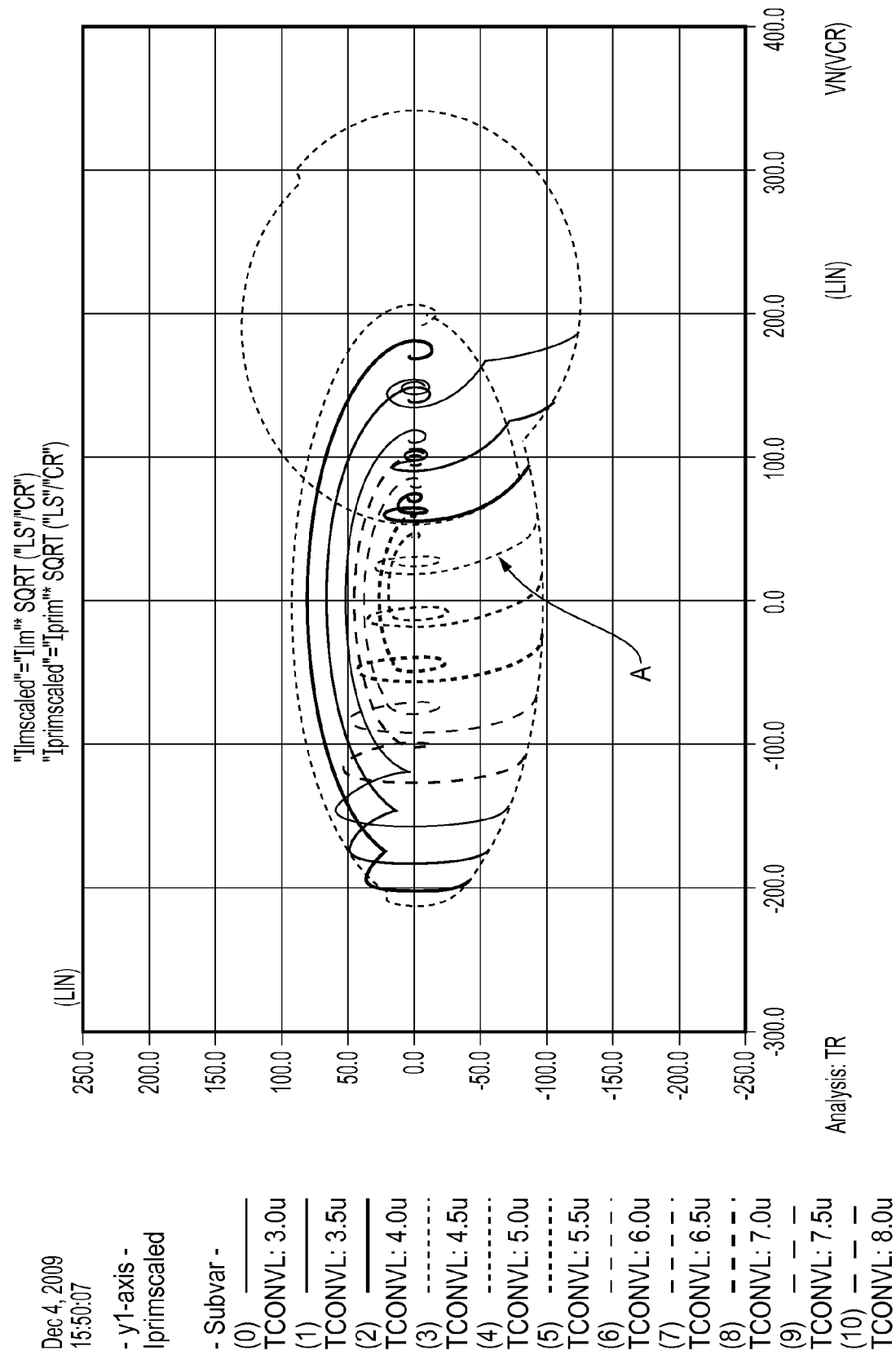
FIG. 26 is a state plane representation for various different discontinuous and continuous energy dump values.

FIG. 24 shows a state plane diagram of the DCM dump method, where the dump interval is started when Vcr crosses the level VcrLdump_DCM. A similar way of thinking can be applied here, as the area of the ellipse including trajectories 28, 30, 32, 34 directly depends on the value of VcrLdump_DCM. In fact the situation without energy dump (as shown in FIG. 20) can be seen as a special case of DCM energy dump where VcrLdump_DCM is chosen at the intersection of the left side of the ellipse comprising interval 32 with Iprim=0. This is illustrated in more detail in FIG. 25, which shows a close-up view of a relevant portion of the state plane diagram of FIG. 21. This case also generates the largest magnetizing current during the elliptical trajectory and therefore results in the largest magnetizing losses. Choosing VcrLdump_DCM at a larger value (i.e. to the right of that indicated in FIG. 23) reduces the area of the ellipse, but also reduces the energy available for soft switching at the start of the next trajectory 24, while it also becomes impossible to reach Vcrl when point 20 lies at the left side of Vcrl. When VcrLdump_DCM is increased further, at the right side of Vcr=0, this increases the area of the ellipse. This is further illustrated in FIG. 26, in which the area of the ellipse is plotted for different VcrLdump_DCM values. When VcrLdump_DCM is chosen to be as far as possible to the left, the situation illustrated in FIG. 25 (and FIG. 21) results, which is the limiting case.

As a result, VcrLdump_DCM may be chosen equal to Vcrl+deltaVcrLdump_DCM, where deltaVcrLdump_DCM is an offset voltage, which may be either positive or negative.

According to a general aspect therefore, when using the above described energy dump interval, the invention comprises interrupting the second conduction interval by opening the second switch after an initial part of the second conduction interval, storing energy in the capacitor whilst the second switch is open and optionally closing the second switch for the remainder of the second conduction interval (depending on whether a DCM or CCM energy dump is used).

The second switch is preferably opened to interrupt the second conduction interval at a moment when a voltage Vcr across the capacitor crosses a voltage level determined by addition of the second sampled voltage level Vcrl to a third predetermined voltage difference (i.e. either deltaVcrLdump_CCM or deltaVcrLdump_DCM).

Further details and preferred features of the energy dump interval method can be found in WO 2009/098640, the disclosure of which is hereby incorporated by reference.

Figure 27:
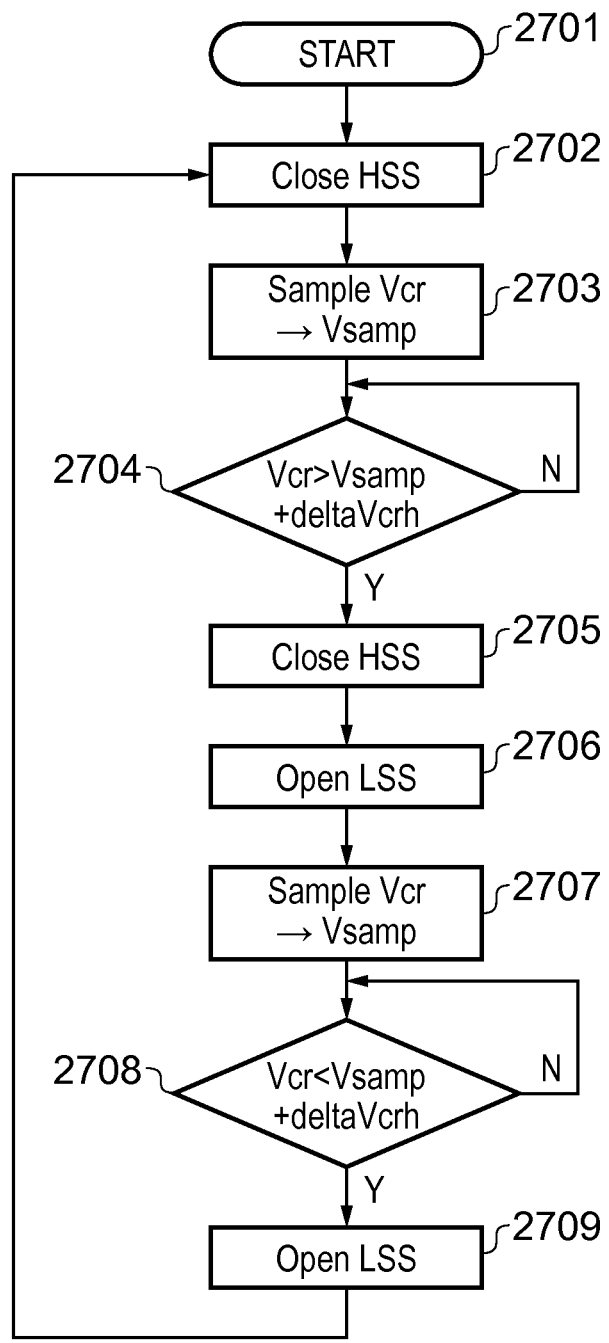
FIG. 27 is a schematic flow diagram illustrating in a general aspect a method according to the invention.

A flow diagram illustrating a method according to a general aspect of the invention is shown in FIG. 27, which illustrates the basic steps involved during first and second conduction intervals corresponding to switching of the high side and low side switches of a half bridge circuit. The method starts (step 2701) and the high side switch is closed (step 2702). The voltage across the capacitor Cr, Vcr, is then sampled (step 2703), resulting in a sampled voltage Vsamp. The voltage across the capacitor Vcr is then compared with the sum of the sampled voltage Vsamp and the predetermined voltage difference deltaVcrh (step 2704). Once Vcr exceeds the sum, the HSS is opened (step 2705). The method may then pause for a short period before closing the low side switch (step 2706). The voltage Vcr is then sampled again (step 2707) resulting in a new value for Vsamp. The voltage Vcr is then compared with the sum of Vsamp with deltaVcrl (step 2708). Once Vcr falls below the sum, LSS is opened. The method may then pause before repeating the whole process.

The values for deltaVcrh and deltaVcrl may be determined in one of a number of different ways, as illustrated in the examples given above, and input at the appropriate points in each part of the cycle.

As described above, in steady state operation the first and second conduction cycles are effectively equal and opposite to each other, with a deltaV equal in magnitude. The method may therefore be fully described according to this aspect of the invention over only one conduction interval.

Resonant converters according to the invention disclosed herein may be applied for use in powering electrical and electronic equipment wherever a resonant topology may be used. Exemplary applications include electrical power adapters, desktop and portable personal computers, servers, audio power supplies and in lighting applications such as for use in ballasts for fluorescent tubes. In such lighting applications, rectification at the secondary side circuit is not required, as the output power is in the form of an AC signal. Mains isolation is also not required, giving the option of not using a transformer and connecting the lamp between nodes of the resonant tank directly. In some embodiments therefore, the resonant converter may not require a secondary side circuit as in the above described embodiments, Other embodiments are intended to be within the scope of the invention, which is defined by the appended claims.

The invention claimed is:

1. A method of controlling a resonant power converter comprising first and second series connected switches connected between a supply voltage line and a ground line and a resonance circuit comprising a capacitor and an inductor, the resonance circuit connected to a node connecting the first and second switches, the method comprising repeated sequential steps of:
    closing the first switch to start a first conduction interval;
    sampling a voltage across the capacitor to obtain a first sampled voltage level;
    opening the first switch to end the first conduction interval when a voltage across the capacitor crosses a voltage level determined by addition of the first sampled voltage level with a first predetermined voltage difference;
    closing the second switch to start a second conduction interval;
    sampling a voltage across the capacitor to obtain a second sampled voltage level; and
    opening the second switch to end the second conduction interval when a voltage across the capacitor crosses a voltage level determined by addition of the second sampled voltage level to a second predetermined voltage difference;
    wherein the first and second conduction intervals alternate over time;
    wherein controlling the first and second predetermined voltage differences determines a power output of the resonant power converter;
    wherein during the first conduction interval the node connecting the switches is connected to the supply voltage line and during the second conduction interval the node is connected to the ground line;
    wherein the first and second predetermined voltage differences are unequal in magnitude, resulting in a changing power output of the resonant power converter.

2. The method of claim 1 wherein a difference between the magnitude of the first and second predetermined voltage differences is dependent on a difference of a sensed voltage across the capacitor and the supply voltage.

3. The method of claim 1 wherein a difference between the magnitude of the first and second predetermined voltage differences is dependent on a duty cycle of a voltage signal at the node connecting the first and second switches.

4. The method of claim 1 wherein a difference between the magnitude of the first and second predetermined voltage differences is dependent on a ratio between a measure of output current over the first conduction interval and the second conduction interval.

5. The method of claim 4 wherein the measure of output current is a peak value or an average value.

6. The method of claim 1 comprising interrupting the second conduction interval by opening the second switch after an initial part of the second conduction interval, storing energy in the capacitor whilst the second switch is open, and optionally closing the second switch for the remainder of the second conduction interval.

7. The method of claim 1 wherein the second switch is opened to interrupt the second conduction interval when a voltage across the capacitor crosses a voltage level determined by addition of the second sampled voltage level to a third predetermined voltage difference.

8. A resonant power converter comprising first and second series connected switches connected between a supply voltage line and a ground line and a resonance circuit comprising a capacitor and an inductor, the resonance circuit connected to a node connecting the first and second switches, wherein the resonant power converter is configured to perform repeated sequential steps of:

closing the first switch to start a first conduction interval;

sampling a voltage across the capacitor to obtain a first sampled voltage level;

opening the first switch to end the first conduction interval when a detector detects a voltage across the capacitor crossing a voltage level determined by addition of the first sampled voltage level with a first predetermined voltage difference;

closing the second switch to start a second conduction interval;

sampling a voltage across the capacitor to obtain a second sampled voltage level; and opening the second switch to end the second conduction interval when a voltage across the capacitor crosses a voltage level determined by addition of the second sampled voltage level to a second predetermined voltage difference;

wherein the first and second conduction intervals alternate over time;

wherein controlling the first and second predetermined voltage differences determines a power output of the resonant power converter;

wherein during the first conduction interval the node connecting the switches is connected to the supply voltage line and during the second conduction interval the node is connected to the ground line;

wherein the first and second predetermined voltage differences are unequal in magnitude, resulting in a changing power output of the resonant power converter.

9. The resonant power converter according to claim 8 wherein the detector comprises a sampling module configured to sample the voltage across the capacitor as the first switch is closed or as the second switch is closed, a summing module configured to provide a signal of the voltage across the capacitor offset by the first or second predetermined voltage difference and a comparator configured to compare the signal from the summing module with the sampled signal and output a signal dependent on the comparison.

* * * * *